(12) United States Patent
Vick, Jr. et al.

(10) Patent No.: US 11,885,202 B2
(45) Date of Patent: Jan. 30, 2024

(54) ELECTRIC/HYDRAULIC SAFETY VALVE

(71) Applicant: Halliburton Energy Services, Inc., Houston, TX (US)

(72) Inventors: James Dan Vick, Jr., Dallas, TX (US); Bruce Edward Scott, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 361 days.

(21) Appl. No.: 16/851,890

(22) Filed: Apr. 17, 2020

(65) Prior Publication Data

US 2020/0392812 A1   Dec. 17, 2020

(51) Int. Cl.
| | |
|---|---|
| *E21B 34/14* | (2006.01) |
| *E21B 34/06* | (2006.01) |
| *E21B 34/16* | (2006.01) |
| *F04C 2/00* | (2006.01) |
| *F04C 2/08* | (2006.01) |
| *F04C 3/02* | (2006.01) |
| *F04B 17/03* | (2006.01) |

(Continued)

(52) U.S. Cl.
CPC ............ *E21B 34/14* (2013.01); *E21B 34/066* (2013.01); *E21B 34/16* (2013.01); *F04B 1/128* (2013.01); *F04B 17/03* (2013.01); *F04B 17/04* (2013.01); *F04C 2/00* (2013.01); *F04C 2/08* (2013.01); *F04C 3/02* (2013.01); *F16L 37/40* (2013.01); *E21B 2200/05* (2020.05)

(58) Field of Classification Search
CPC ........ E21B 34/14; E21B 34/066; E21B 34/16; E21B 2200/05; F04B 1/128; F04B 17/03; F04B 17/04; F04B 7/0076; F04B 15/02; F04B 23/04; F04B 23/06; F04B 47/06; F04C 2/00; F04C 2/08; F04C 3/02; F04C 2/10; F04C 2/16; F04C 13/008; F04C 14/28; F04C 15/066; F16L 37/40
See application file for complete search history.

(56) References Cited

U.S. PATENT DOCUMENTS

| | | | |
|---|---|---|---|
| 6,148,843 A | * | 11/2000 | Pringle ................ E21B 43/123 137/155 |
| 6,619,388 B2 | | 9/2003 | Dietz et al. |

(Continued)

FOREIGN PATENT DOCUMENTS

| | | |
|---|---|---|
| EP | 0962622 A2 | 12/1999 |
| EP | 2492558 A1 | 8/2012 |

(Continued)

*Primary Examiner* — Michael R Wills, III
(74) *Attorney, Agent, or Firm* — Scott Richardson; Parker Justiss, P.C.

(57) ABSTRACT

Provided is an electro/hydraulic valve for use in a hydrocarbon production well, an electrically surface-controlled subsurface safety valve, and a method of operating an electrically surface-controlled subsurface safety valve. The electro/hydraulic valve for use in a hydrocarbon production well, in one aspect, includes a fluid chamber and an electro/mechanical pump having a fluid inlet and a fluid outlet, and further wherein an inlet check valve is positioned in fluid communication between the fluid chamber and the fluid inlet and an outlet check valve is positioned in fluid communication between the fluid outlet and a hydraulically controlled actuation member.

21 Claims, 14 Drawing Sheets

(51) Int. Cl.
*F04B 17/04* (2006.01)
*F16L 37/40* (2006.01)
*F04B 1/128* (2020.01)

(56) References Cited

U.S. PATENT DOCUMENTS

| | | | |
|---|---|---|---|
| 6,988,556 B2 | 1/2006 | Vick, Jr. | |
| 7,213,653 B2 | 5/2007 | Vick, Jr. | |
| 7,434,626 B2 | 10/2008 | Vick, Jr. | |
| 7,597,149 B2 | 10/2009 | Williamson, Jr. et al. | |
| 7,610,964 B2 | 11/2009 | Cox | |
| 7,624,807 B2 | 12/2009 | Vick, Jr. | |
| 7,635,029 B2 | 12/2009 | MacDougall et al. | |
| 8,038,120 B2 | 10/2011 | Vick, Jr. et al. | |
| 8,573,304 B2 | 11/2013 | Vick, Jr. et al. | |
| 8,869,881 B2 | 10/2014 | Vick, Jr. et al. | |
| 8,919,730 B2 | 12/2014 | Vick, Jr. | |
| 9,010,448 B2 | 4/2015 | Williamson, Jr. et al. | |
| 9,068,425 B2 | 6/2015 | Williamson, Jr. et al. | |
| 9,556,707 B2 | 1/2017 | Vick, Jr. et al. | |
| 9,574,423 B2 | 2/2017 | Williamson, Jr. et al. | |
| 2002/0108747 A1 | 8/2002 | Dietz et al. | |
| 2003/0051881 A1* | 3/2003 | Vinegar | E21B 34/066 166/66.6 |
| 2003/0159829 A1 | 8/2003 | Fripp et al. | |
| 2009/0314497 A1 | 12/2009 | Johnson | |
| 2010/0084588 A1* | 4/2010 | Curtiss, III | E21B 34/16 251/57 |
| 2010/0236793 A1 | 9/2010 | Bjorgum | |
| 2013/0333894 A1 | 12/2013 | Geiger et al. | |
| 2015/0000982 A1 | 1/2015 | McDowell et al. | |
| 2021/0215020 A1* | 7/2021 | Deville | F15B 15/20 |

FOREIGN PATENT DOCUMENTS

| | | |
|---|---|---|
| WO | 2006135565 A2 | 12/2006 |
| WO | 2019089487 A1 | 5/2019 |

* cited by examiner

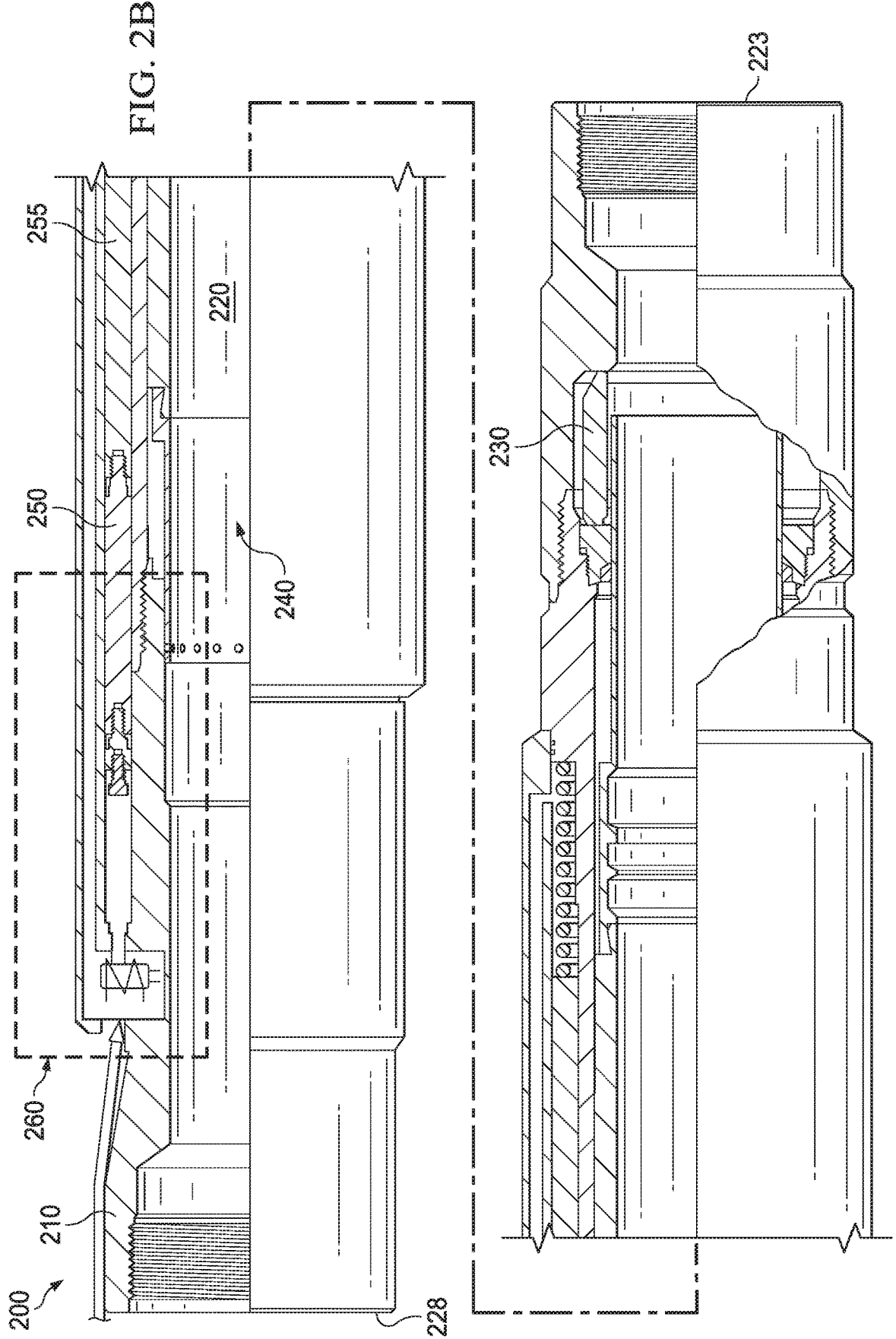

ELECTRIC/HYDRAULIC SAFETY VALVE

CROSS-REFERENCE TO RELATED APPLICATION

This application claims priority to International Application No. PCT/US2019/036813, filed on Jun. 12, 2019, entitled "ELECTRIC/HYDRAULIC SAFETY VALVE," commonly assigned with this application and incorporated herein by reference in its entirety.

BACKGROUND

Subsurface safety valves (SSSVs) are well known in the oil and gas industry and provide one of many failsafe mechanisms to prevent the uncontrolled release of wellbore fluids, should a wellbore system experience a loss in containment. Typically, SSSVs comprise a portion of a tubing string set in place during completion of a wellbore. Although a number of design variations are possible for SSSVs, the vast majority are flapper-type valves that open and close in response to longitudinal movement of a flow tube.

Since SSSVs provide a failsafe mechanism, the default positioning of the flapper valve is usually closed in order to minimize the potential for inadvertent release of wellbore fluids. The flapper valve can be opened through various means of control from the earth's surface in order to provide a flow pathway for production to occur. What is needed in the art is an improved SSSV that does not encounter the problems of existing SSSVs.

BRIEF DESCRIPTION

Reference is now made to the following descriptions taken in conjunction with the accompanying drawings, in which:

FIGS. 2A and 2B illustrate one embodiment of an ESCSSV designed and manufactured according to the present disclosure, in a closed state and an open state, respectively;

Figure 1:
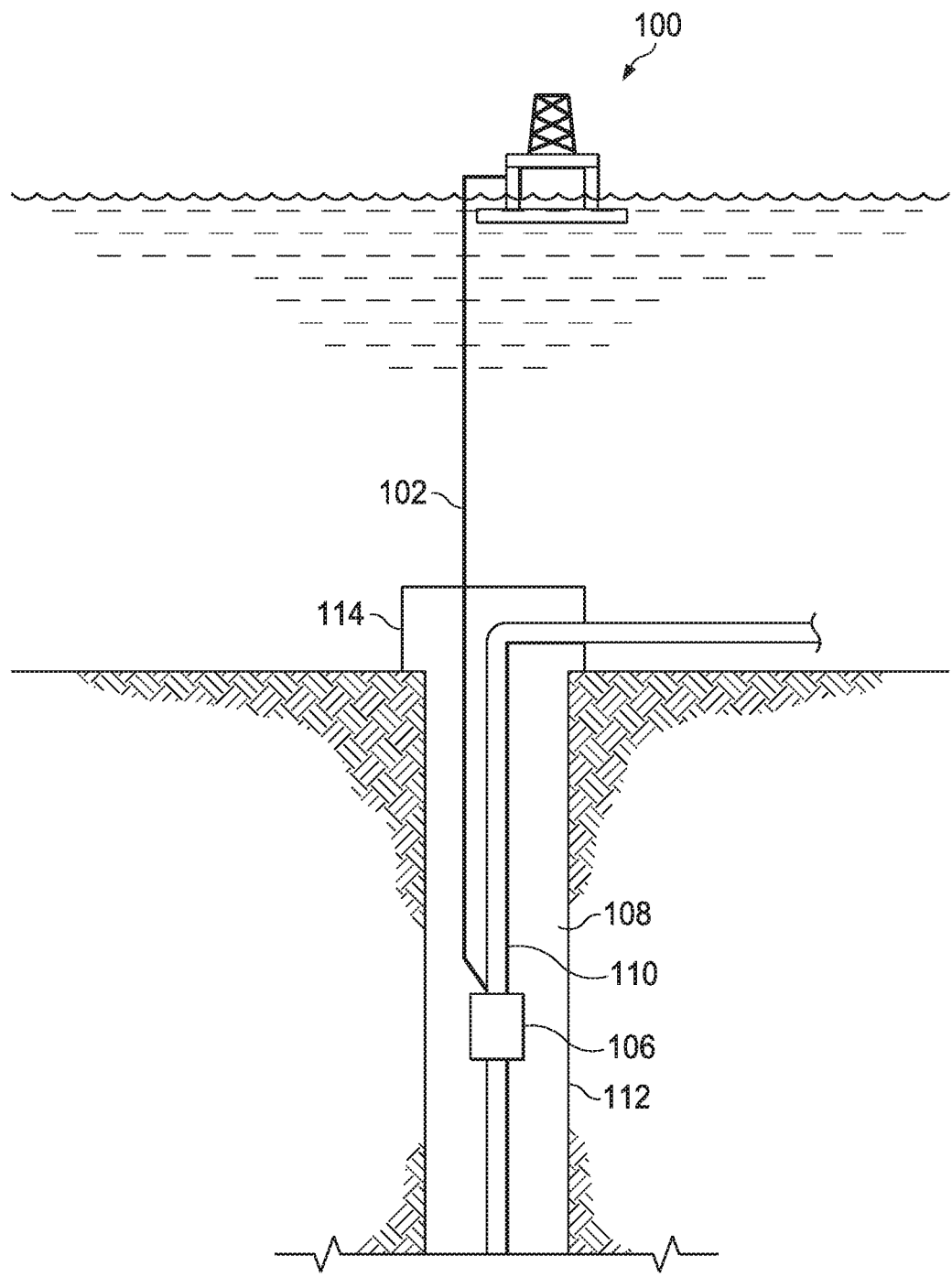
FIG. 1 illustrates a subterranean production well employing an electrically surface-controlled subsurface safety valve (ESCSSV) constructed according to the principles of the present disclosure.

FIGS. 3A thru 3D illustrate various different configurations for an electro/hydraulic valve (e.g., as might be used in the ESCSSV of FIGS. 2A and 2B) manufactured and designed according to the disclosure;

FIGS. 4A thru 4D illustrate various different electro/thermal expansion pumps that might be used as the electro/hydraulic valve associated with an ESCSSV manufactured and designed according to the disclosure; and FIGS. 5A thru 5H illustrate various different electro/mechanical pumps that might be used as the electro/hydraulic valve associated with an ESCSSV manufactured and designed according to the disclosure.

DETAILED DESCRIPTION

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally toward the surface of the formation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

The present disclosure has acknowledged that offshore wells are being drilled at ever increasing water depths and in environmentally sensitive waters, and thus safety valves are necessary. The present disclosure has further acknowledged that hydraulically controlled safety valves have inherent problems. Given the foregoing acknowledgements, the present disclosure has recognized that electrically surface-controlled subsurface safety valves (ESCSSV) address many of the problems the industry encounters.

ESCSSVs according to the disclosure may be actuated using an electro/hydraulic valve (e.g., which may include an electro/thermal expansion pump or electro/mechanical pump in certain embodiments), as opposed to traditional strictly hydraulic or strictly electric valves, without the need for additional surface hydraulic control and/or balance lines. By eliminating the need for additional surface hydraulic control and balance lines, the ESCSSV may have increased failsafe ability as compared to other safety valves. Failsafe may be defined as a condition in which the valve or associated control system may be damaged and the electrically actuated safety valve retains the ability to close. In some examples, the ESCSSV may fail in a closed position (e.g., closed state), thus ensuring that wellbore fluids and pressure are contained. In another example, the ESCSSV may fail in an open position (e.g., flow state) but closes automatically when an electrical connection to the surface is damaged or severed without any additional external input.

FIG. 1 illustrates an offshore platform 100 connected to an ESCSSV 106 via electrical connection 102. An annulus 108 may be defined between walls of well 112 and a conduit 110. Wellhead 114 may provide a means to hand off and seal conduit 110 against well 112 and provide a profile to latch a subsea blowout preventer to. Conduit 110 may be coupled to wellhead 114. Conduit 110 may be any conduit such as a casing, liner, production tubing, or other tubulars disposed in a wellbore.

The ESCSSV 106 may be interconnected in conduit 110 and positioned in well 112. Although the well 112 is depicted in FIG. 1 as an offshore well, one of ordinary skill should be able to adopt the teachings herein to any type of well, including onshore or offshore. Electrical connection 102 may extend into the well 112 and may be connected to the ESCSSV 106. Electrical connection 102 may provide power to the ESCSSV 106. As will be described in further detail below, power may be provided to the ESCSSV 106 to actuate or de-actuate the ESCSSV 106. Actuation may comprise opening the ESCSSV 106 to provide a flow path for wellbore fluids to enter conduit 110, and de-actuation may comprise closing the ESCSSV 106 to close a flow path for wellbore fluids to enter conduit 110.

Figure 2A:
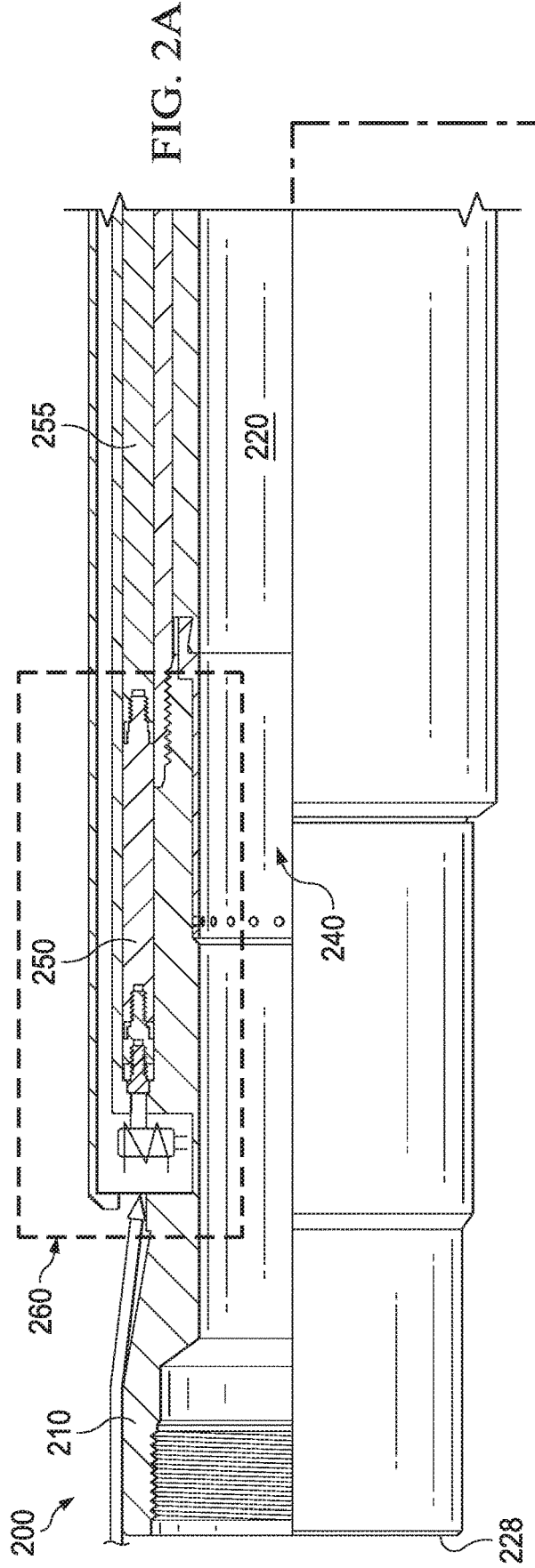
Figure 2A:
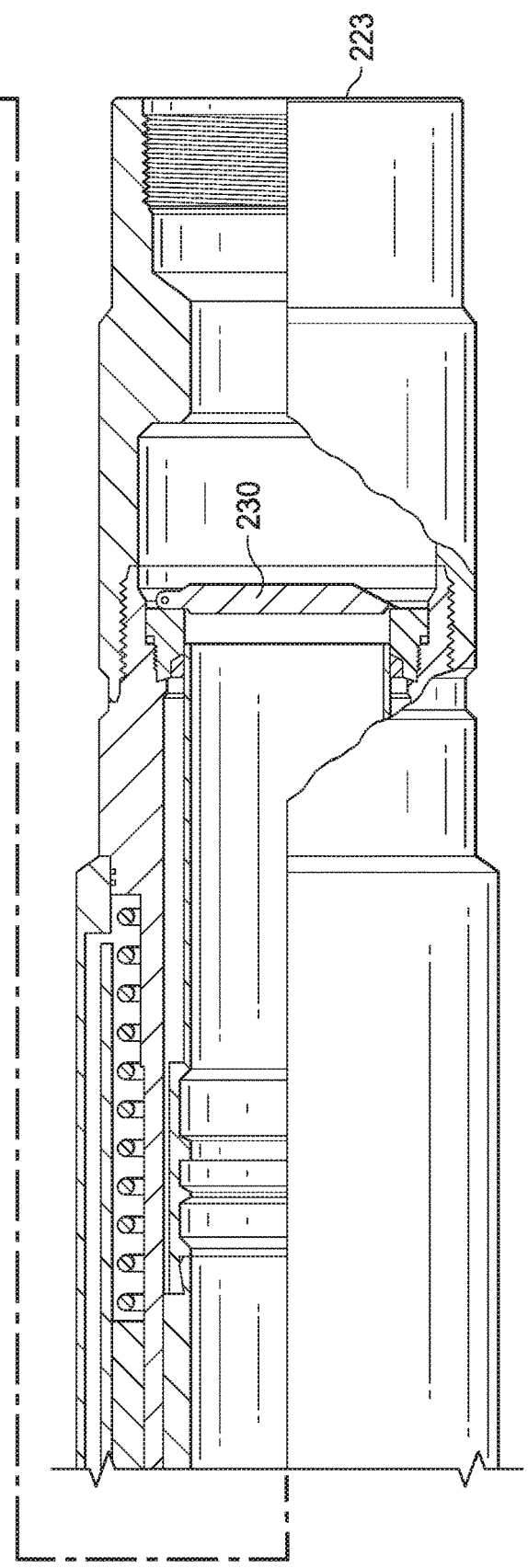

Turning now to FIGS. 2A and 2B, illustrated is one embodiment of an ESCSSV 200 designed and manufactured according to the present disclosure, in a closed state and an open state, respectively. The ESCSSV 200, in the embodiment of FIGS. 2A and 2B, includes an outer housing 210. The outer housing 210 in the illustrated embodiment includes a central bore 220 extending there through, the central bore 220 operable to convey subsurface production fluids from a subterranean formation. The central bore 220, in the illustrated embodiment, includes a lower section 223 and an upper section 228.

The ESCSSV 200 additionally includes a valve closure mechanism 230 disposed proximate the lower section 223 of the central bore 220. The valve closure mechanism 230 may isolate the lower section 223 of the central bore 220 from the upper section 228, which may prevent formation fluids and pressure from flowing through the ESCSSV 200 when valve closure mechanism 230 is in a closed position. Valve closure mechanism 230 may be any type of valve such as a flapper type valve or a ball type valve. FIG. 2A illustrates the valve closure mechanism 230 as being a flapper type valve in the closed position, whereas FIG. 2B illustrates the valve closure mechanism 230 as being a flapper type valve in the open position.

The ESCSSV 200 additionally includes a bore flow management actuator 240 disposed in the central bore 220. The bore flow management actuator 240, in the illustrated embodiment, is a flow tube configured to move between a retracted state (e.g., as shown in FIG. 2A) and a deployed state (e.g., as shown in FIG. 2B) to engage or disengage the valve closure mechanism 230. Accordingly, the bore flow management actuator 240 may determine a flow condition of subsurface production fluids through the central bore 220, simply by moving between the retracted state and the deployed state.

The ESCSSV 200 additionally includes a hydraulically controlled actuation member 250 coupled to the bore flow management actuator 240. The hydraulically controlled actuation member 250, which is illustrated in FIGS. 2A and 2B as a piston, may linearly move, which in turn moves the bore flow management actuator 240 between the retracted state and the deployed state (e.g., engaging the valve closure mechanism 230 to move it to the open position). In the embodiment of FIGS. 2A and 2B, the hydraulically controlled actuation member 250 and the bore flow management actuator 240 are coupled using one or more magnets 255. Thus, as the hydraulically controlled actuation member 250 moves downhole it magnetically moves the bore flow management actuator 240 downhole. In other embodiments, however, the hydraulically controlled actuation member 250 physically contacts the bore flow management actuator 240, thus having the same effect as the magnetic connection.

The ESCSSV 200 illustrated in FIGS. 2A and 2B additionally includes an electro/hydraulic valve 260. The electro/hydraulic valve 260, in the illustrated embodiment, is configured to linearly move the hydraulically controlled actuation member 250, and thus move the bore flow management actuator 240 between the retracted state (e.g., as shown in FIG. 2A) and the deployed state (e.g., as shown in FIG. 2B).

Turning now to FIGS. 3A thru 3D, illustrated are various different configurations for an electro/hydraulic valve 300 (e.g., as might be used in the ESCSSV 200 of FIGS. 2A and 2B) manufactured and designed according to the disclosure. The electro/hydraulic valve 300 of FIG. 3A includes a fluid chamber 310. The fluid chamber 310, in accordance with the disclosure, is filled (e.g., partially, substantially, or entirely) with one of many different types of hydraulic fluids. The fluid chamber 310, in the illustrated embodiment, is part of a closed loop system. The phrase "closed loop system", as used herein, means that any fluid that may leak amongst the features of the electro/hydraulic valve 300 will return back to the fluid chamber 310. For example, if a seal associated with a piston of the ESCSSV were to fail, the fluid that were to leak as a result of the faulty seal would return back to the fluid chamber 310. Such a closed loop system may be found in a "DepthStar" safety valve system, as might be purchased from Halliburton Energy Services, Inc., having a principal place of business at 3000 N. Sam Houston Pkwy E., Houston, Texas 77032.

Figure 3A:
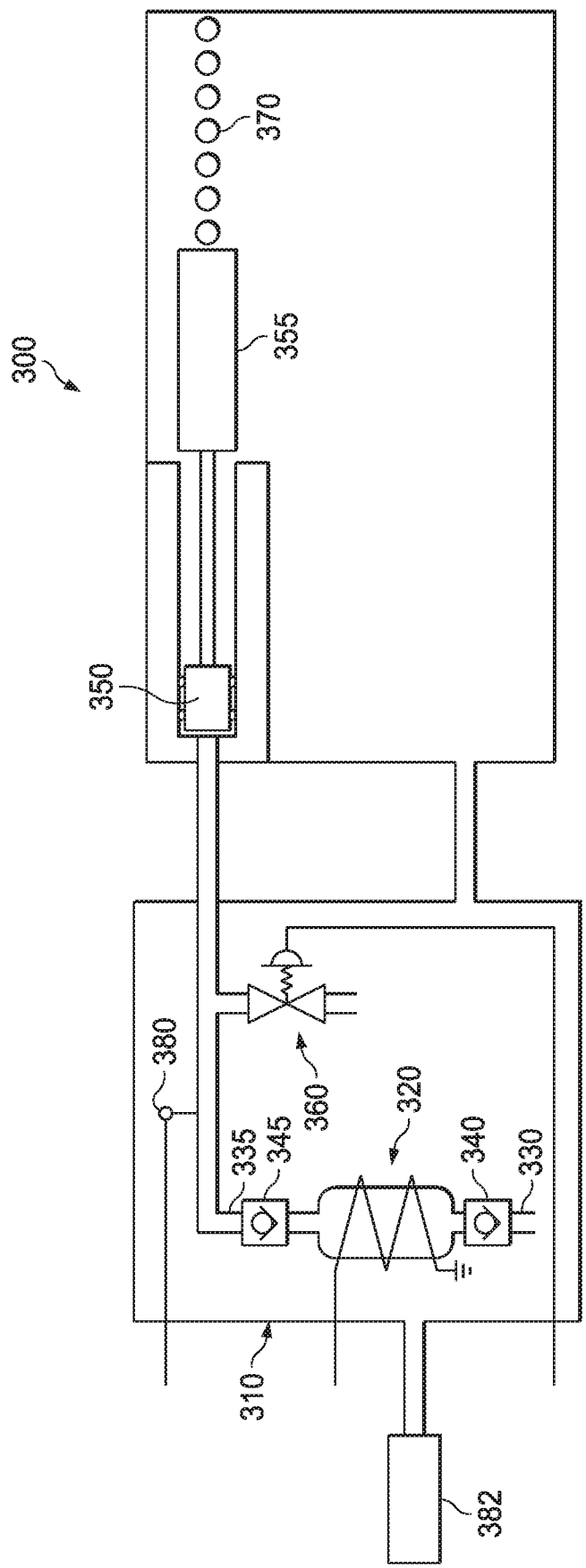

The electro/hydraulic valve 300 illustrated in FIG. 3A additionally includes a pump 320 (e.g., in certain embodiments, an electro/thermal expansion pump or an electro/mechanical pump). The pump 320, in the illustrated embodiment, has a fluid inlet 330 and a fluid outlet 335. In accordance with the disclosure, an inlet check valve 340 may be positioned in fluid communication between the fluid chamber 310 and the fluid inlet 330, and an outlet check valve 345 may be positioned in fluid communication between the fluid outlet 335 and a hydraulically controlled actuation member 350 (e.g., a piston in the illustrated embodiment). In the illustrated embodiment of FIG. 3A, the pump 320 draws fluid from the fluid chamber 310 and supplies it to an uphole side of the hydraulically controlled actuation member 350 for linear movement thereof. Further to this embodiment, the hydraulically controlled actuation member 350 may be coupled to a magnet 355, which in turn could be coupled to the bore flow management actuator of the ESCSSV.

The electro/hydraulic valve 300 illustrated in FIG. 3A additionally includes a relief valve 360. The relief valve 360, in the illustrated embodiment, is positioned in fluid communication between the outlet check valve 345 and the hydraulically controlled actuation member 350. In one embodiment, the relief valve 360 is a power to close relief valve, and thus when powered it is in the closed state, but when power is cut to the relief valve 360 it automatically returns to the open state. Accordingly, if power is ever lost to the electro/hydraulic valve 300, the relief valve 360 will open and thus allow the hydraulically controlled actuation member 350 to return to its unactuated state. In the illustrated embodiment, a spring 370 may be used to assist the hydraulically controlled actuation member 350 to return to its unactuated state if the relief valve 360 is opened.

The electro/hydraulic valve 300 illustrated in FIG. 3A additionally includes a pressure sensor 380. The pressure sensor 380, in accordance with one embodiment, is positioned in fluid communication between the outlet check valve 345 and the hydraulically controlled actuation member 350. The pressure sensor 380 may be used to determine a pressure being applied to the hydraulically controlled actuation member 350, and thus may be used to determine a state of the hydraulically controlled actuation member 350. The pressure sensor 380 may have logic, and thus be able to send pressure measurements outside of the electro/hydraulic valve 300, or alternatively may have a maximum pressure value that it can handle before opening, much like a dummy pop-off-valve. The pressure sensor 380 may additionally provide feedback to the pump 320, as to when it should operate and not operate. The electro/hydraulic valve 300 illustrated in FIG. 3A additionally includes a compensating sub 382.

An electro/hydraulic valve, such as the electro/hydraulic valve 300 illustrated in FIG. 3A, may be operated by supplying power to the pump 320. With power being supplied to the pump 320, whether a constant supply of power or intervals between sending power and cutting power (e.g., wherein cutting power to the electro/hydraulic valve 300 cools liquid remaining therein, thereby drawing additional new liquid from the fluid chamber through the inlet check valve to the electro/thermal expansion pump), the pump 320 draws fluid from the fluid chamber 310 through the fluid inlet 330 and past the fluid inlet check valve 340, and provides the fluid past the fluid outlet check valve 345 and the fluid outlet 335, to urge the hydraulically controlled actuation member 350 downhole. In those instances where the supply of power is intermittent, the outlet check valve 345 keeps fluid, and thus pressure, on the hydraulically controlled actuation member 350, until the supply of power is reapplied to the pump 320, and thus the hydraulically controlled actuation member 350 is urged further downhole. As is depicted in the embodiment of FIG. 3A, any fluid leaks in the electro/hydraulic valve 300 will return to the fluid chamber 310, whether it be a leak in seals of the hydraulically controlled actuation member 350, the relief valve 360, the pressure sensors 380, etc.

In the illustrated embodiment of FIG. 3A, three separate power/control signal lines are coupled to the components thereof. A first power/control signal line is coupled to the pump 320, thus instructing the pump 320 when to run and when to not run. A second power/control signal line is coupled to the relief valve 360, thus instructing the relief valve 360 when to close and when to open. A third power/control signal line is coupled to the pressure sensor 380. However, there are several power/control line configurations other than the three line configuration shown in FIG. 3A. For example, the third power/control signal line can be eliminated by using a mechanical pressure limiter as the pressure sensor 380. An example would be when the pressure on the uphole side of the piston 350 reaches a given pressure, the mechanical pressure limiter opens a contact that stops power going to the pump 320. When the pressure drops back below the given pressure, the mechanical pressure limiter closes the contact and power is restored to the pump 320. Additionally, the first and second power/control signal lines could be combined. In this configuration, at lower power the power to close relief valve 360 remains closed, but the power is not sufficient to drive the pump 320 in a manner sufficient to increase the pressure on the uphole side of piston 350, but at higher power the power to close relief valve 360 remains closed and the pump 320 is operated in a manner sufficient to increase the pressure on the uphole side of the piston 350. Furthermore, combining the above two discussed scenarios, could provide a system wherein a single power/control signal line could operate the entire electro/hydraulic valve 300.

Figure 3B:
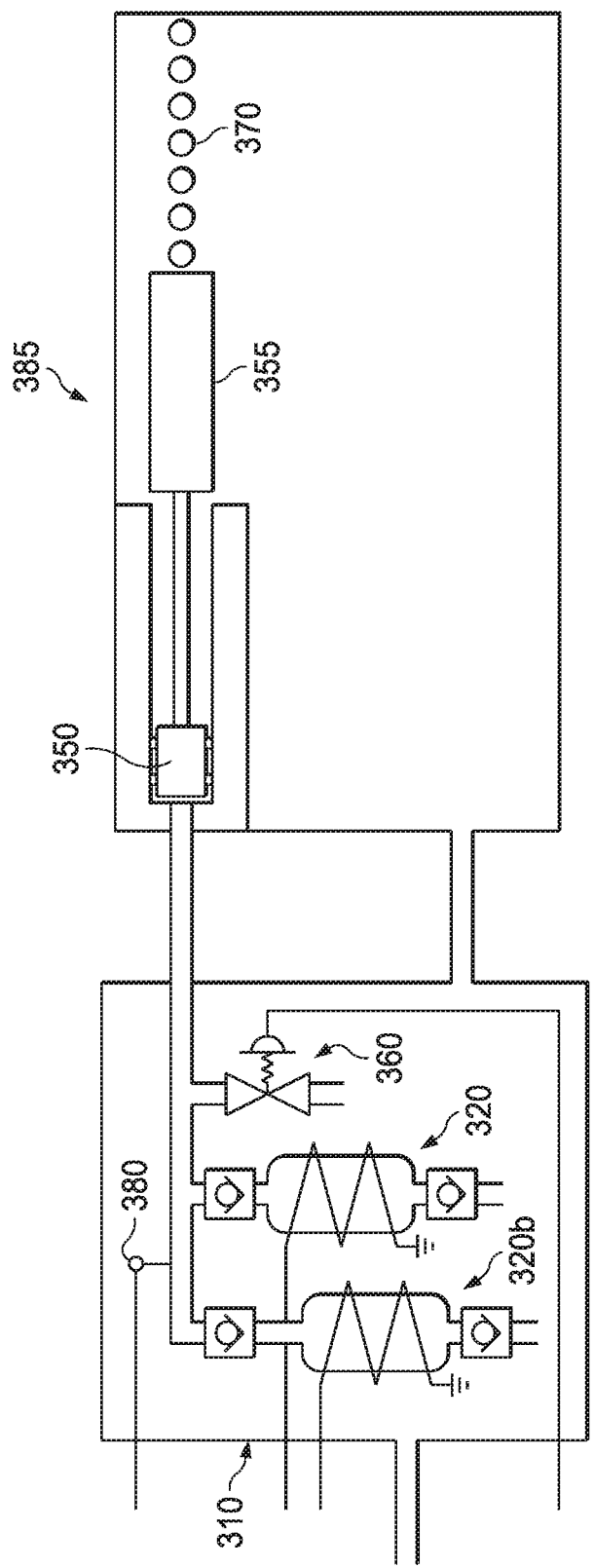

Turning to FIG. 3B, illustrated is an alternative embodiment of an electro/hydraulic valve 385 manufactured and designed according to the disclosure. The electro/hydraulic valve 385 is similar in many respects to the electro/hydraulic valve 300 illustrated in FIG. 3A. Accordingly, like reference numbers have been used to indicate similar, if not identical, features. The electro/hydraulic valve 385 primarily differs from the electro/hydraulic valve 300 in that the electro/hydraulic valve 385 includes a second pump 320b, which may provide redundancy for the pump 320. The second pump 320b has similar, if not identical, features as the pump 320.

Figure 3C:
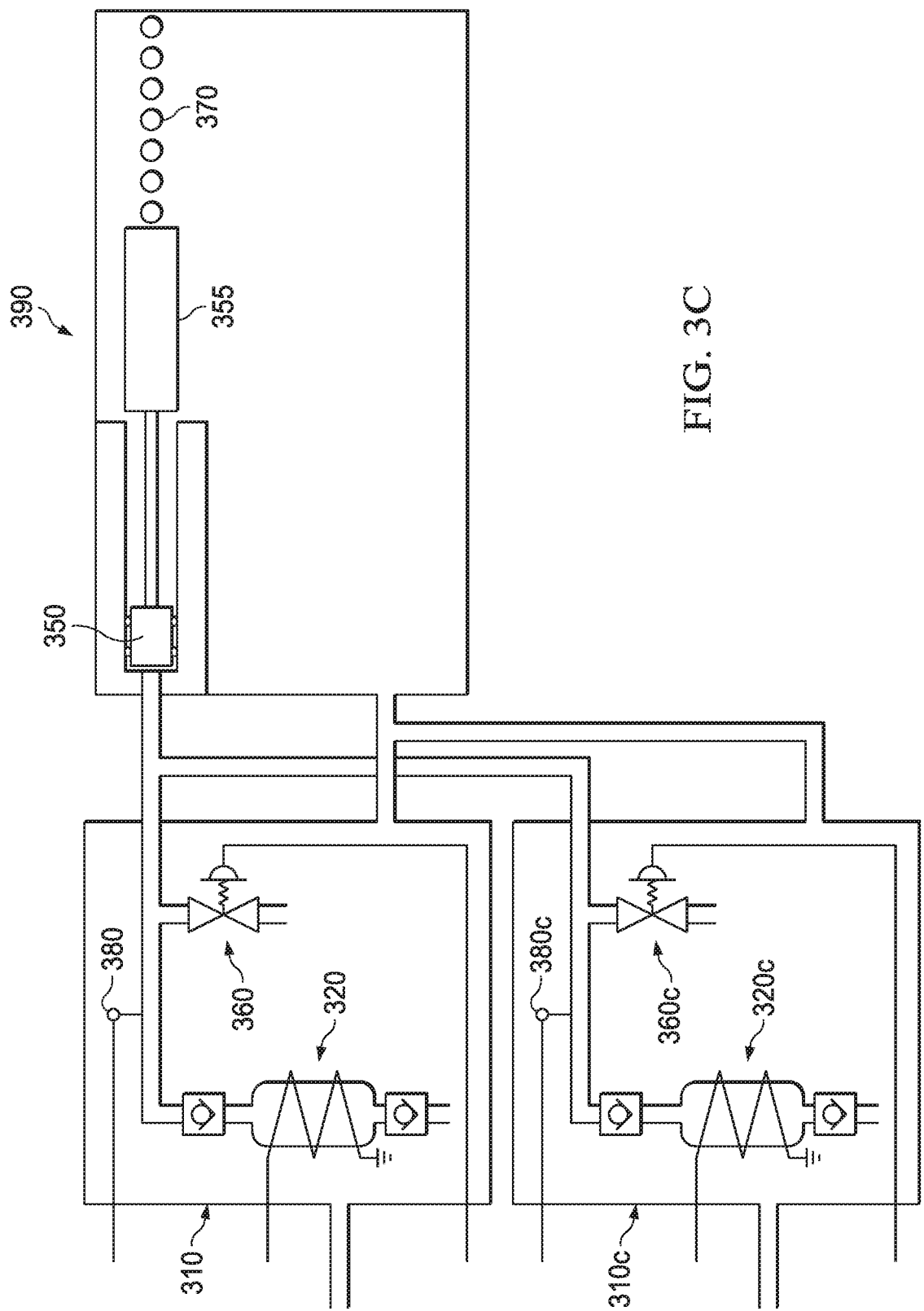

Turning to FIG. 3C, illustrated is an alternative embodiment of an electro/hydraulic valve 390 manufactured and designed according to the disclosure. The electro/hydraulic valve 390 is similar in many respects to the electro/hydraulic valve 300 illustrated in FIG. 3A, and the electro/hydraulic valve 385 illustrated in FIG. 3B. Accordingly, like reference numbers have been used to indicate similar, if not identical, features. The electro/hydraulic valve 390 primarily differs from the electro/hydraulic valve 300 in that the electro/hydraulic valve 390 includes redundancies substantially across the board. For example, the electro/hydraulic valve 390 includes a second fluid chamber 310c, a second pump 320c, a second relief valve 360c, and a second pressure sensor 380c, all of which are positioned in fluid communication with the hydraulically controlled actuation member 350. Such a scenario would provide additional redundancies over the electro/hydraulic valve 385 illustrated in FIG. 3B.

Figure 3D:
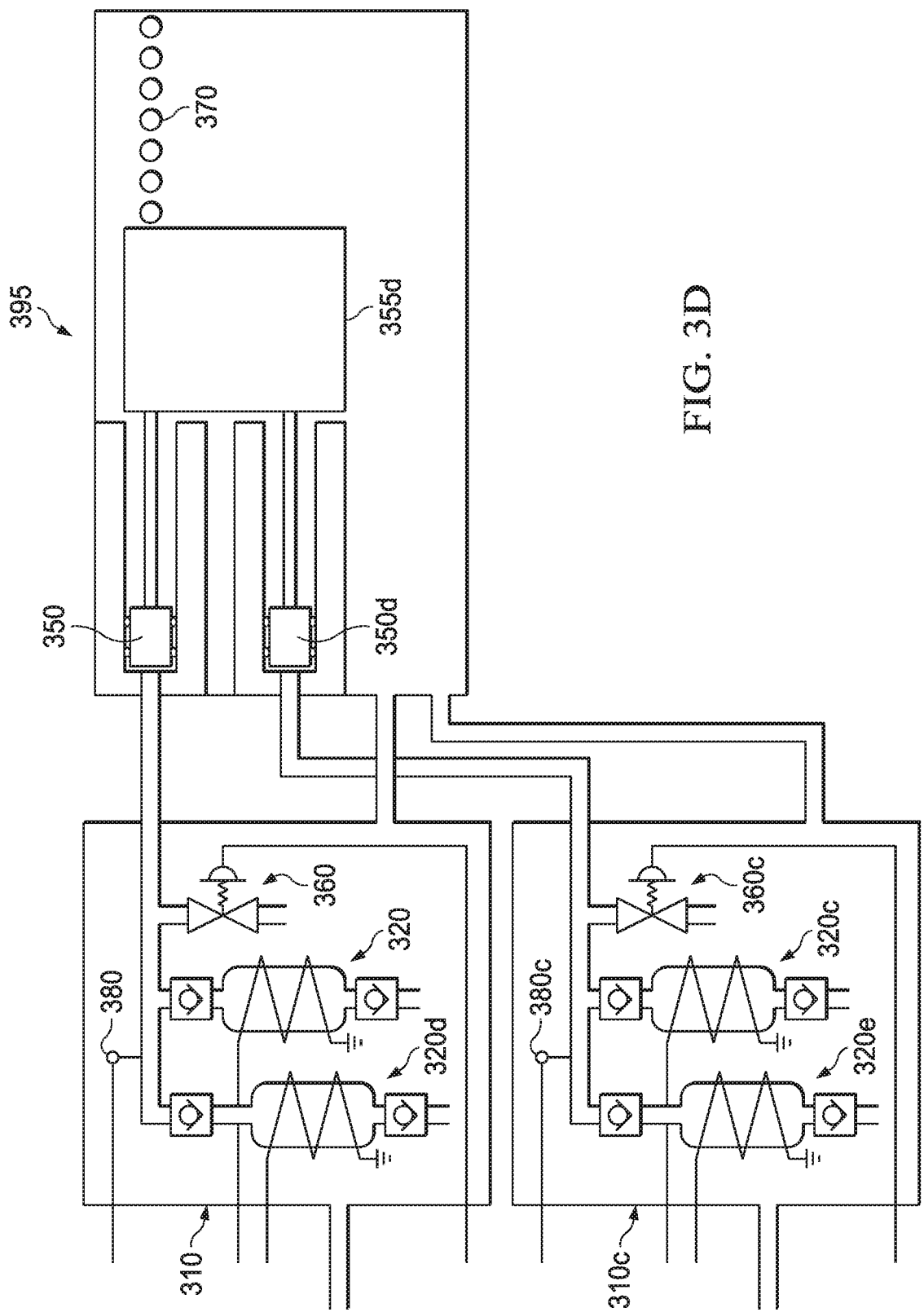

Turning to FIG. 3D, illustrated is an alternative embodiment of an electro/hydraulic valve 395 manufactured and designed according to the disclosure. The electro/hydraulic valve 395 is similar in many respects to the electro/hydraulic valve 300 illustrated in FIG. 3A, electro/hydraulic valve 385 illustrated in FIG. 3B, and electro/hydraulic valve 390 illustrated in FIG. 3C. Accordingly, like reference numbers have been used to indicate similar, if not identical, features. The electro/hydraulic valve 395 primarily differs from the electro/hydraulic valve 390 in that the electro/hydraulic valve 395 includes redundancies for each of the fluid chambers 310, 310c. For example, the electro/hydraulic valve 395 includes a third pump 320d in the first fluid chamber 310, and a fourth pump 320e in the second fluid chamber 310c. Additionally, in the embodiment of FIG. 3D, the first pump 320 and third pump 320d are coupled in fluid communication with the piston 350, whereas the second pump 320c and fourth pump 320e are coupled in fluid communication with a second piston 350d. In this scenario, even if seals of the first piston 350 were to fail, and thus the piston 350 could not be urged downhole, the second piston 350d could still urged downhole, and thus the corresponding magnet 355d could be urged downhole.

One of the key features of a electro/hydraulic valve manufactured and designed according to the disclosure, as well as an ESCSSV incorporating such a valve, is the durability and longevity (e.g., life) of the valve. ESCSSV's, and particularly tubing retrievable valves, are intended to be in service for the life of the well, and are typically not serviceable once installed in the well. As the life of a well may be 20+ years, the durability and longevity is important. Robustness of the individual components and subsystems of the valve and ESCSSV are the first means of ensuring the life of the tool. The redundancies associated with FIGS. 3B thru 3D help increase "mission" reliability of the system as a whole.

The types of pumps discussed above and illustrated in FIGS. 2A thru 3D may vary greatly and remain within the scope of the present disclosure. For example, the pumps discussed above, or alternatively illustrated in FIGS. 2A thru 3D, may comprise one or more different types of electro/thermal expansion pumps, electro/mechanical pumps, or other similar pumps, and remain within the scope of the present disclosure.

Figure 4A:
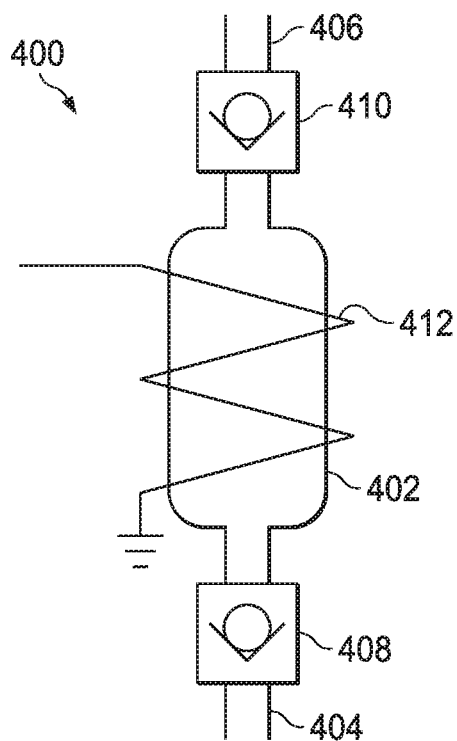

Turning to FIGS. 4A thru 4D, illustrated are various different electro/thermal expansion pumps that might be used as the electro/hydraulic valve associated with an ESCSSV manufactured and designed according to the disclosure. FIG. 4A illustrates an induction heated electro/thermal expansion pump 400 that might be used with an ESCSSV according to the disclosure. The induction heated electro/thermal expansion pump 400, in this embodiment, includes an expansion chamber 402 having a fluid inlet 404 and a fluid outlet 406, as well as an inlet check valve 408 and an outlet check valve 410. The induction heated electro/thermal expansion pump 400 additionally includes an induction coil 412 coupled to the expansion chamber 402. The induction coil 412, in this embodiment, produces a magnetic field that heats up the expansion chamber 402. Those skilled in the art, given the disclosure herein, understand the various different operating conditions for the induction heated electro/thermal expansion pump 400.

Figure 4B:
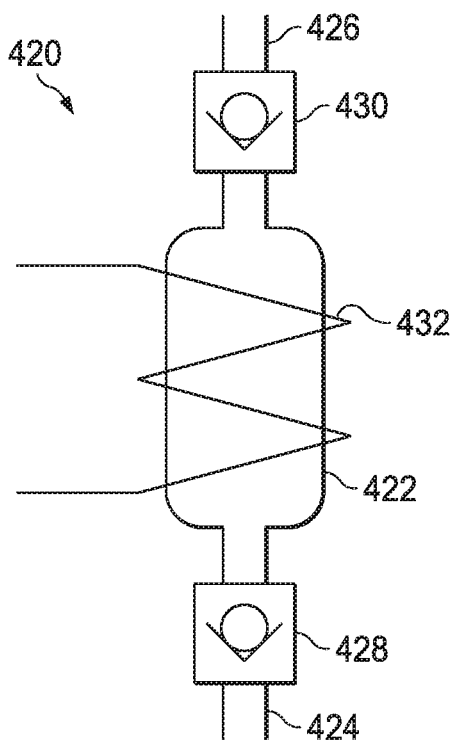

FIG. 4B illustrates a heating coil heated electro/thermal expansion pump 420 that might be used with an ESCSSV manufactured and designed according to the disclosure. The heating coil heated electro/thermal expansion pump 420, in this embodiment, includes an expansion chamber 422 having a fluid inlet 424 and a fluid outlet 426, as well as an inlet check valve 428 and an outlet check valve 430. The heating coil heated electro/thermal expansion pump 420 additionally includes a heating coil 432 coupled to the expansion chamber 422. The heating coil 432, in this embodiment, may directly heat any fluid located within the expansion chamber 422, or alternatively may heat the expansion chamber 422 which in turn heats the fluid located therein. Those skilled in the art, given the disclosure herein, understand the various different operating conditions for the heating coil heated electro/thermal expansion pump 420.

Figure 4D:
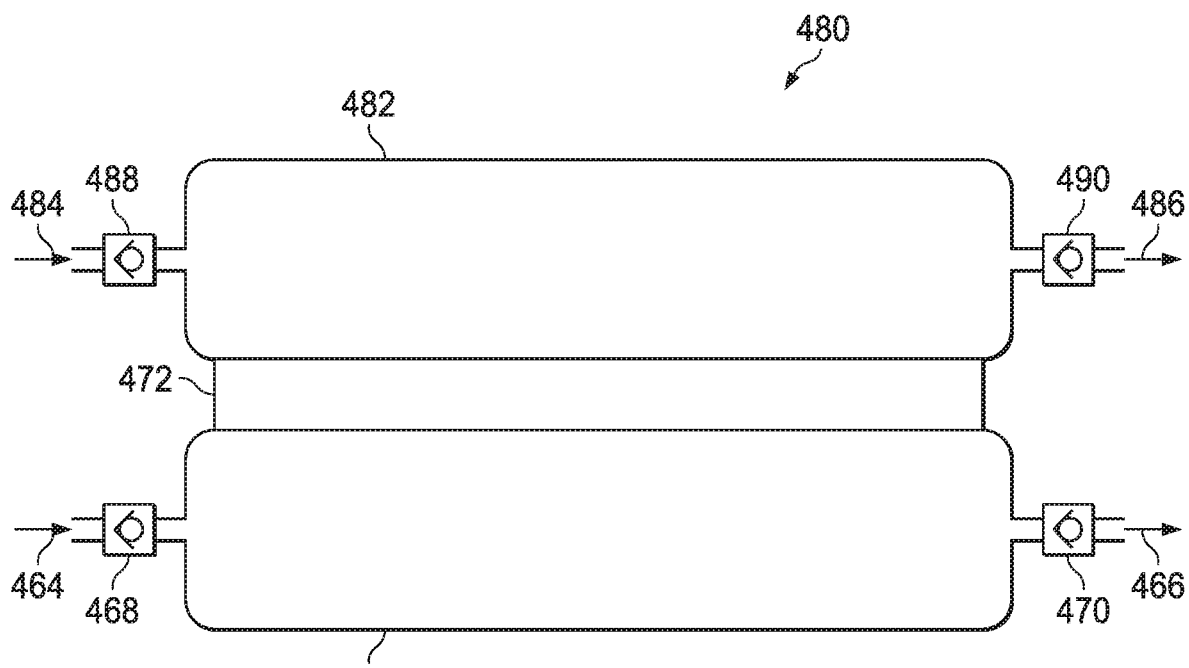
Figure 4C:
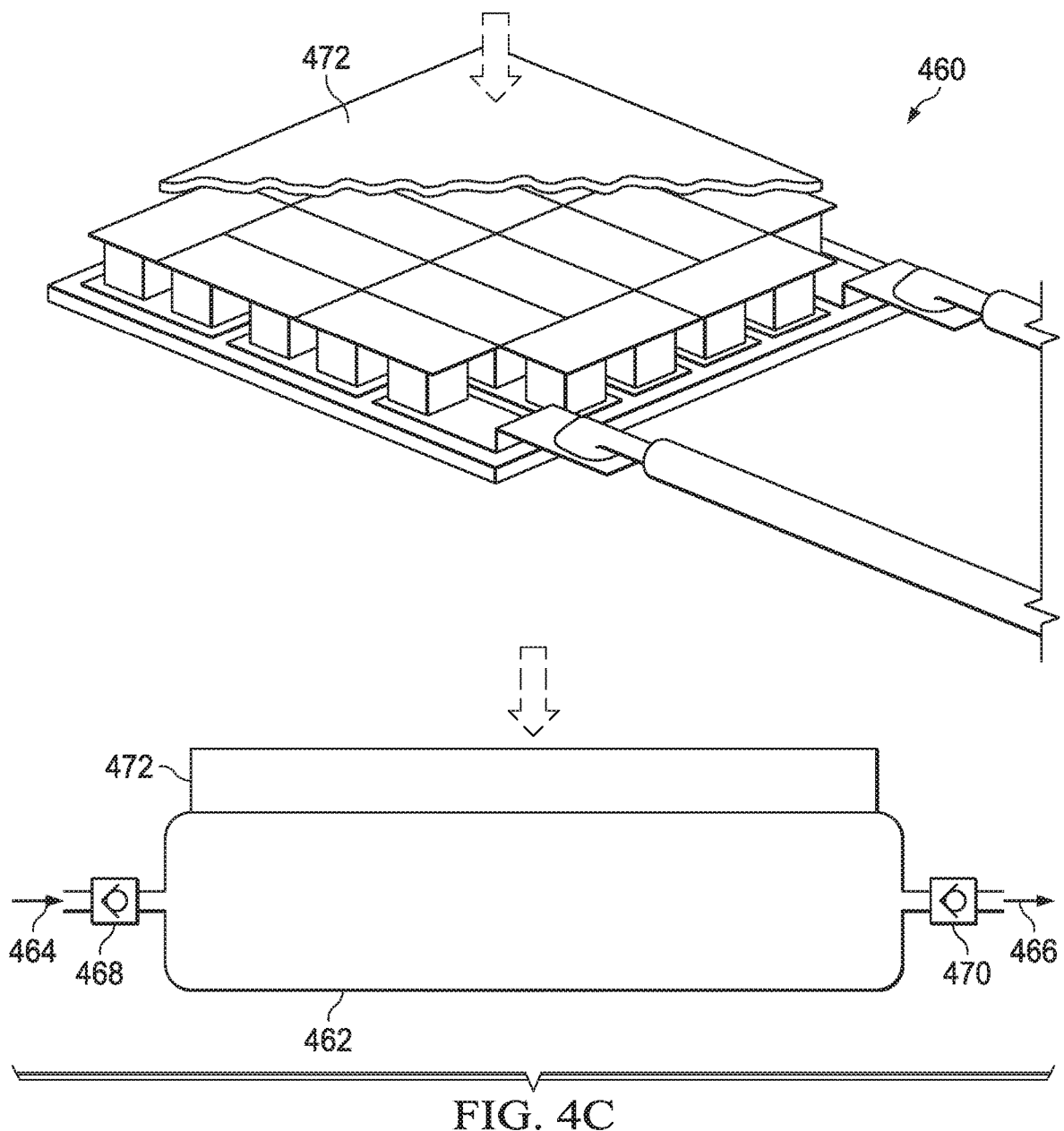

FIG. 4C illustrates a thermoelectric module heated electro/thermal expansion pump 460 that might be used with an ESCSSV manufactured and designed according to the disclosure. The thermoelectric module heated electro/thermal expansion pump 460, in this embodiment, includes an expansion chamber 462 having a fluid inlet 464 and a fluid outlet 466, as well as an inlet check valve 468 and an outlet check valve 470. The thermoelectric module heated electro/thermal expansion pump 460 additionally includes a thermoelectric module 472 coupled to the expansion chamber 462. The thermoelectric module 472, in this embodiment, may use the Peltier effect to create a heat flux between the junctions of two different types of materials, and thus transfer heat from one side of the thermoelectric module 472 to the other, for example using electricity. Depending on the direction of the current, the thermoelectric module 472 (e.g., when placed in contact with the expansion chamber 462) may heat the expansion chamber 462 and thus any fluids located therein. Those skilled in the art, given the disclosure herein, understand the various different operating conditions for the thermoelectric module heated electro/thermal expansion pump 460.

FIG. 4D illustrates an alternative embodiment of a thermoelectric module heated electro/thermal expansion pump 480 that might be used with an ESCSSV manufactured and designed according to the disclosure. The thermoelectric module heated electro/thermal expansion pump 480, is similar in many respects to the thermoelectric module heated electro/thermal expansion pump 460. Accordingly, like reference numbers have been used to indicate similar, if not identical, features. The thermoelectric module heated electro/thermal expansion pump 480 primarily differs from the thermoelectric module heated electro/thermal expansion pump 460 in that the thermoelectric module heated electro/thermal expansion pump 480 includes a second expansion chamber 482 placed on an opposite side of the thermoelectric module 472 as the expansion chamber 462. The second expansion chamber 482, in this embodiment, includes a second fluid inlet 484 and a second fluid outlet 486, as well as a second inlet check valve 488 and a second outlet check valve 490. Accordingly, the thermoelectric module heated electro/thermal expansion pump 480 has the advantage that while actively cooling one expansion chamber (e.g., expansion chamber 482) it may actively heat the other expansion chamber (e.g., expansion chamber 462). Moreover by reversing the polarity of the thermoelectric module 472, the opposite expansion chambers could be cooled and heated, which allows the delay time between pumping and cooling to approach zero. Thus, such a thermoelectric module heated electro/thermal expansion pump 480 could provide substantially continuous pumping, in contrast to other options. Those skilled in the art, given the disclosure herein, understand the various different operating conditions for the thermoelectric module heated electro/thermal expansion pump 480.

Figure 5A:
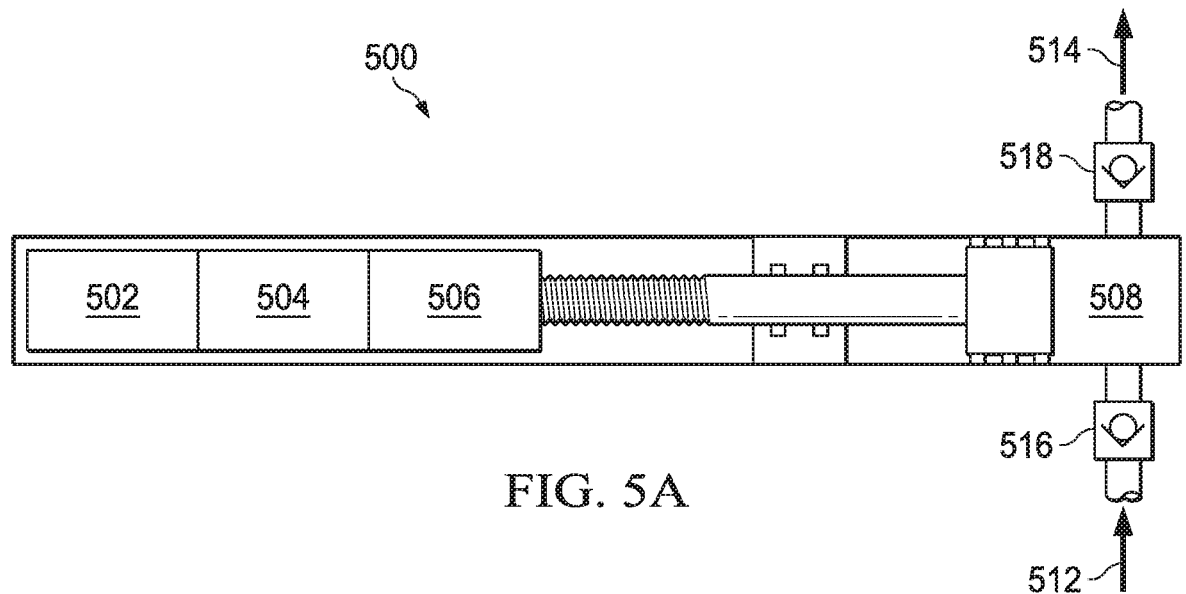

Turning to FIGS. 5A thru 5H, illustrated are various different electro/mechanical pumps that might be used as the electro/hydraulic valve associated with an ESCSSV manufactured and designed according to the disclosure. FIG. 5A illustrates a linear actuator ball-screw pump 500 that might be used with an ESCSSV manufactured and designed according to the disclosure. The ball-screw pump 500, in the illustrated embodiment, includes a motor 502 (e.g., brushless motor in one embodiment), gearbox 504 and ball-screw 506 combination, coupled to a pump 508. In the illustrated embodiment, the ball-screw pump 500 additionally includes a fluid inlet 512 and a fluid outlet 514, as well as an inlet check valve 516 and an outlet check valve 518. Those skilled in the art, given the disclosure herein, understand the various different operating conditions for the ball-screw pump 500.

Figure 5B:
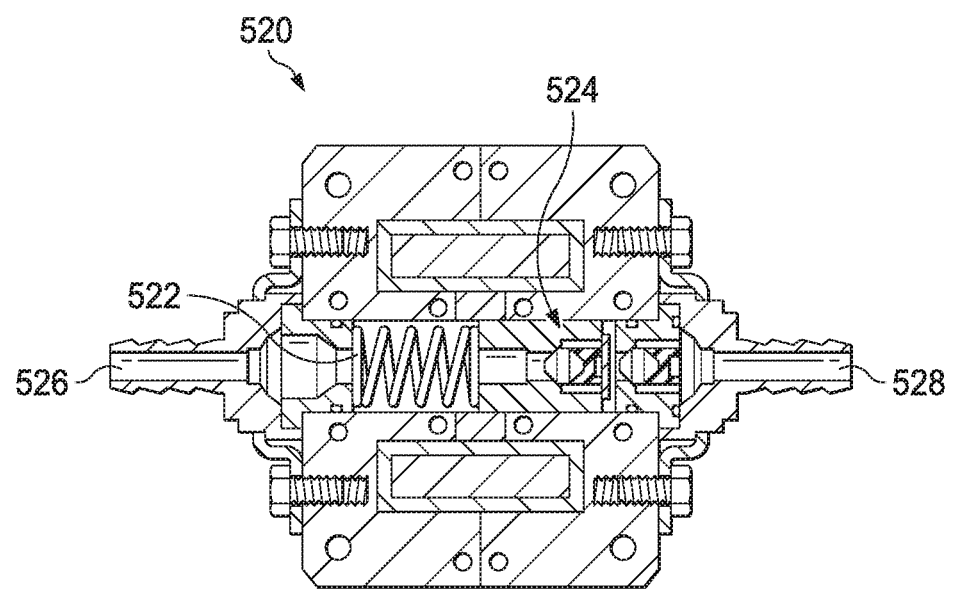

Turning to FIG. 5B, illustrated is a solenoid pump 520 that might be used with an ESCSSV manufactured and designed according to the disclosure. The solenoid pump 520, in the illustrated embodiment, includes a pressure spring 522, and an inlet valve assembly 524, among other features, as well as a fluid inlet 526 and fluid outlet 528. While not shown, the solenoid pump 520 may additionally include an inlet check valve and outlet check valve. Those skilled in the art, given the disclosure herein, understand the various different operating conditions for the solenoid pump 520.

Figure 5C:
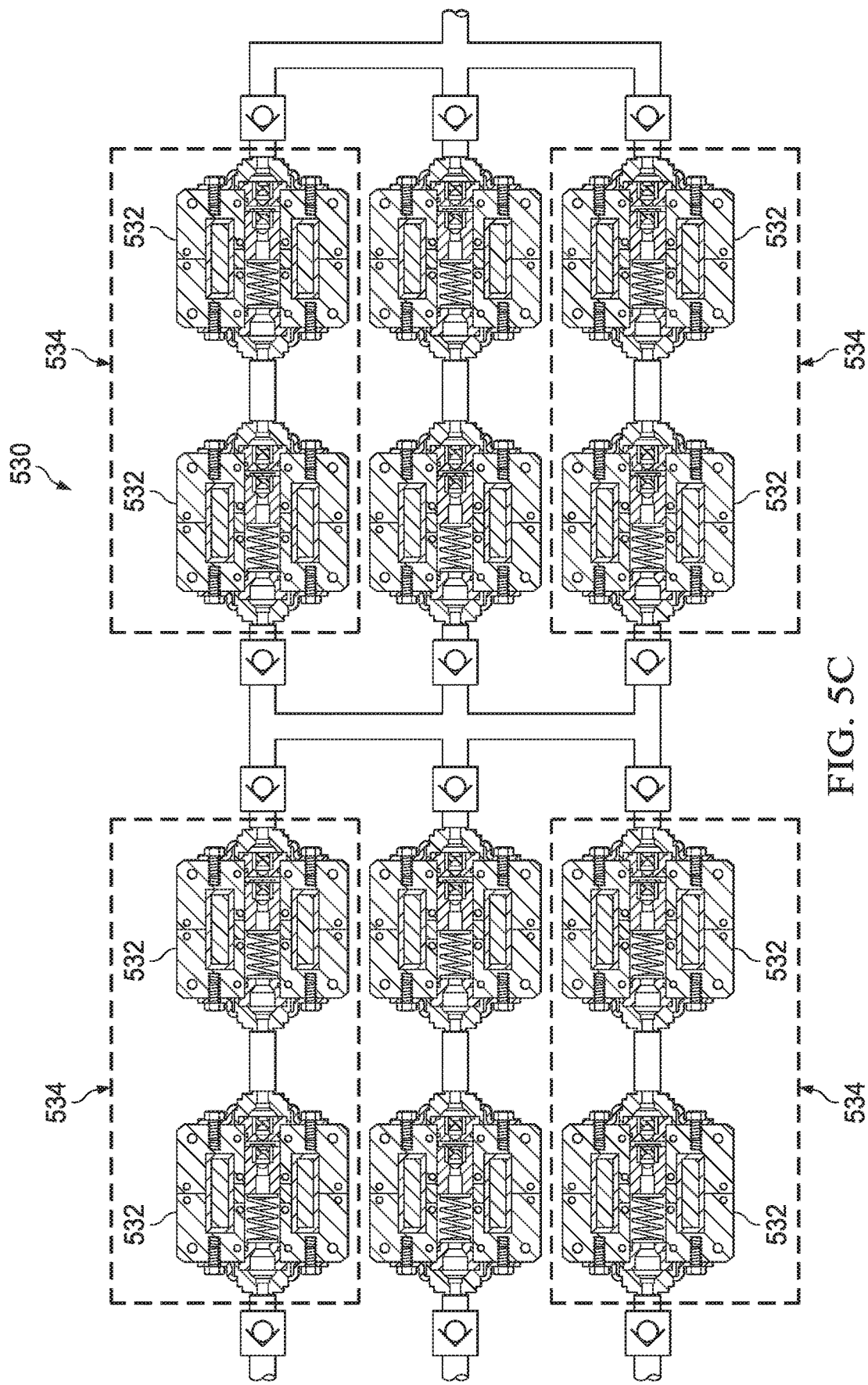

Turning to FIG. 5C, illustrated is an alternative embodiment of a solenoid pump system 530 that might be used with an ESCSSV manufactured and designed according to the disclosure. Depending on the pressure requirements for the ESCSSV, a single solenoid pump may not be sufficient. Accordingly, multiple solenoid pumps 532 may be daisy chained together in series as a single bank 534, for example to achieve higher pressure requirements. For example, if a single solenoid pump 532 is only capable of 200 psi, and it was desirous to achieve a higher pressure requirement of 1600 psi, eight solenoid pumps 532 could be daisy chained together as a single bank 534. FIG. 5C further illustrates that for more redundancy, multiple banks 534 of daisy chained solenoid pumps 532 could be configured in a sophisticated network. Such a sophisticated network of banks 534 would be advantageous if a single solenoid pump 532 in a given bank 534 were capable of causing the entire bank 534 to fail. Those skilled in the art, given the disclosure herein, understand the various different operating conditions for the solenoid pump system 530.

Figure 5D:
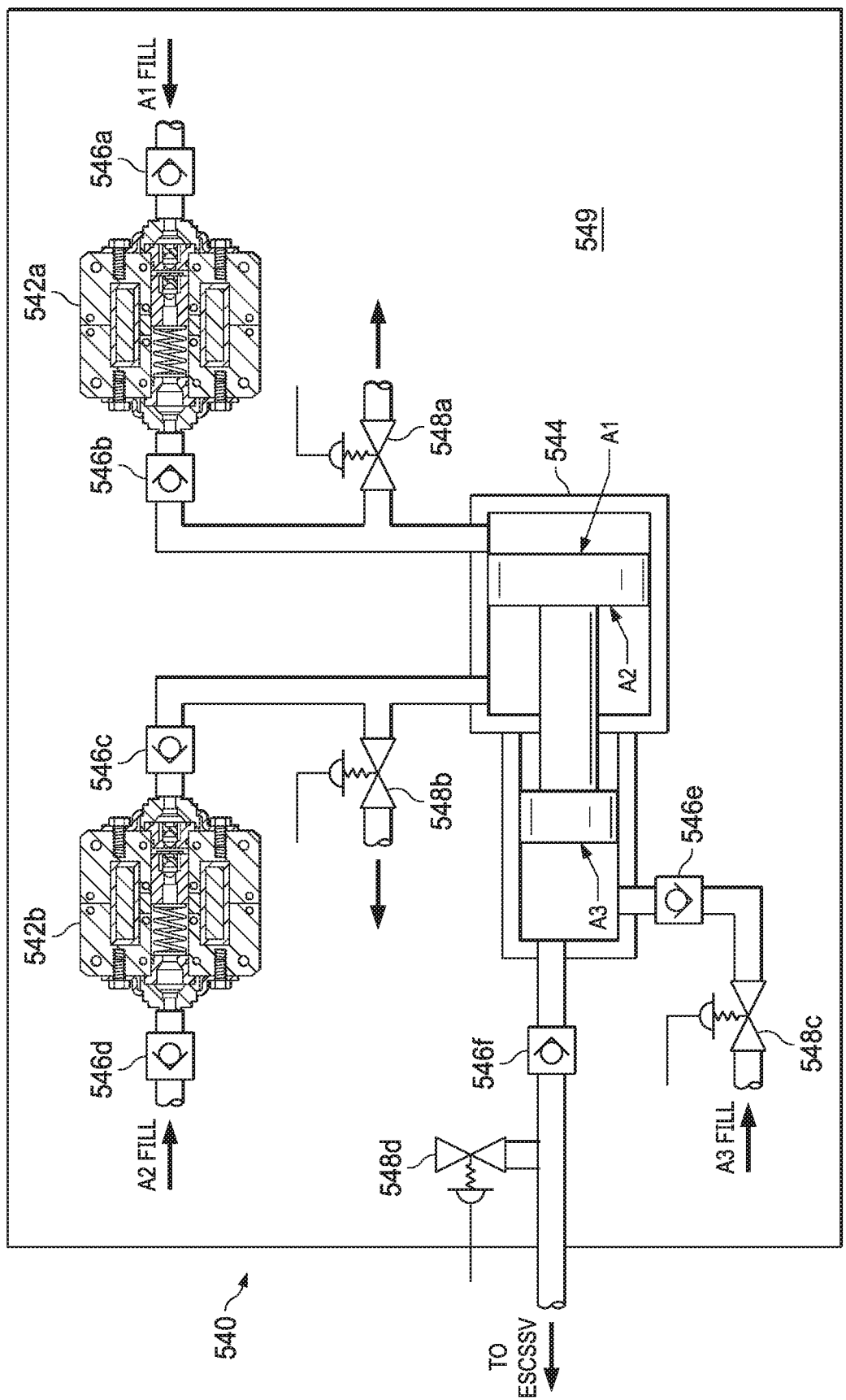

Turning to FIG. 5D, illustrated is an alternative embodiment of a solenoid pump system 540 that might be used with an ESCSSV manufactured and designed according to the disclosure. The solenoid pump system 540, in the embodiment illustrated in FIG. 5D, includes a pair of solenoid pumps 542a, 542b, coupled to an intensifier 544 (e.g., having a low pressure side A1, a control pressure side A2, and a high pressure side A3) using a variety of different check valves 546a, 546b, 546c, 546d, 546e, and 546f, and relief valves 548a, 548b, 548c, 548d, all of which are located in a fluid chamber 549. The intensifier 544, in the illustrated embodiment, intensifies the pressure output of the system to the ESCSSV, having essentially the same effect as the solenoid pump system 530 disclosed above in FIG. 5C.

One embodiment of a process flow for operating the solenoid pump system 540 will now be discussed. To start the solenoid pump system 540 for operation, relief valves 548a, 548b, 548c would all be set to an open state. This would start to fill the solenoid pump system 540, for example from the fluid located in the fluid chamber 549. To set the system for operation, relief valves 548a, 548c would be set to an open state, while valve 548b would be set to a closed state. Additionally, solenoid pump 542b would be activated, which would create pressure on A2, thus forcing the intensifier piston to the right, or to a retracted state. To open the ESCSSV, or to increase pressure on the ESCSSV piston, relief valves 548a, 548c, 548d would be set to a closed state, while valve 548b would be set to an open state. Additionally, solenoid pump 542a would be activated, which would create pressure on A1 thus forcing the intensifier piston to the left, or to an extended state. This would cause increased control pressure on the high pressure side A3, which translates to the piston (not shown) on the ESCSSV. To reset the intensifier 544, relief valve 548a and 548c would be set to an open state, and relief valves 548b would be set to closed states, and solenoid pump 542b would be activated, which would create pressure on A2 thus forcing the intensifier piston to the right, or to a retracted state, and allowing the high pressure side A3 to fill via the A3 fill. To close the ESCSSV, relief valve 548d could be opened.

Figure 5E:
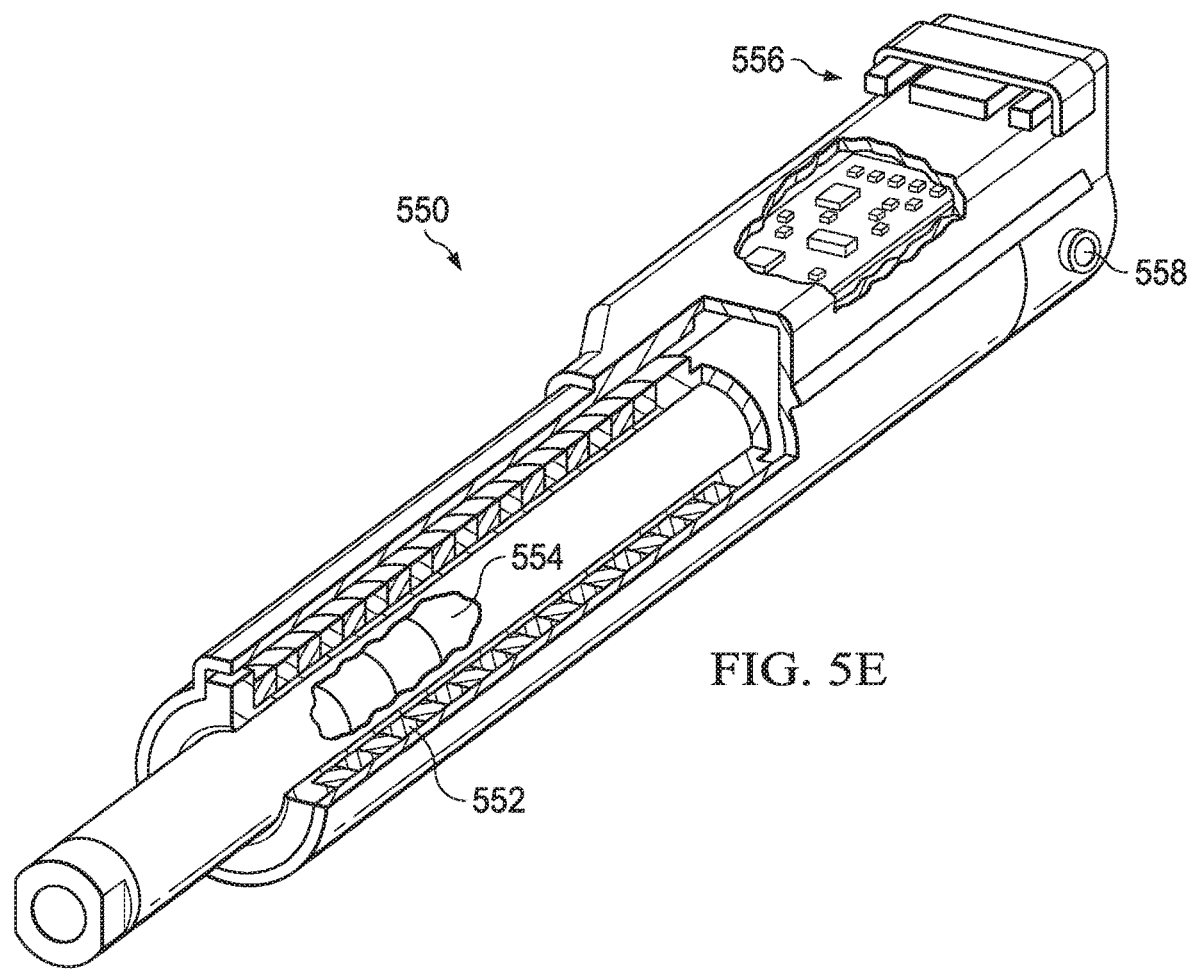

Turning to FIG. 5E, illustrated is an electromagnet actuator pump 550 that might be used with an ESCSSV manufactured and designed according to the disclosure. The electromagnet actuator pump 550, in the illustrated embodiment, includes a stator winding 552 and slider with magnets 554, among other features, as well as a fluid inlet 556 and fluid outlet 558. While not shown, the electromagnet actuator pump 550 may additionally include an inlet check valve and an outlet check valve in certain embodiments. Those skilled in the art, given the disclosure herein, understand the various different operating conditions for the electromagnet actuator pump 550.

Figure 5F:
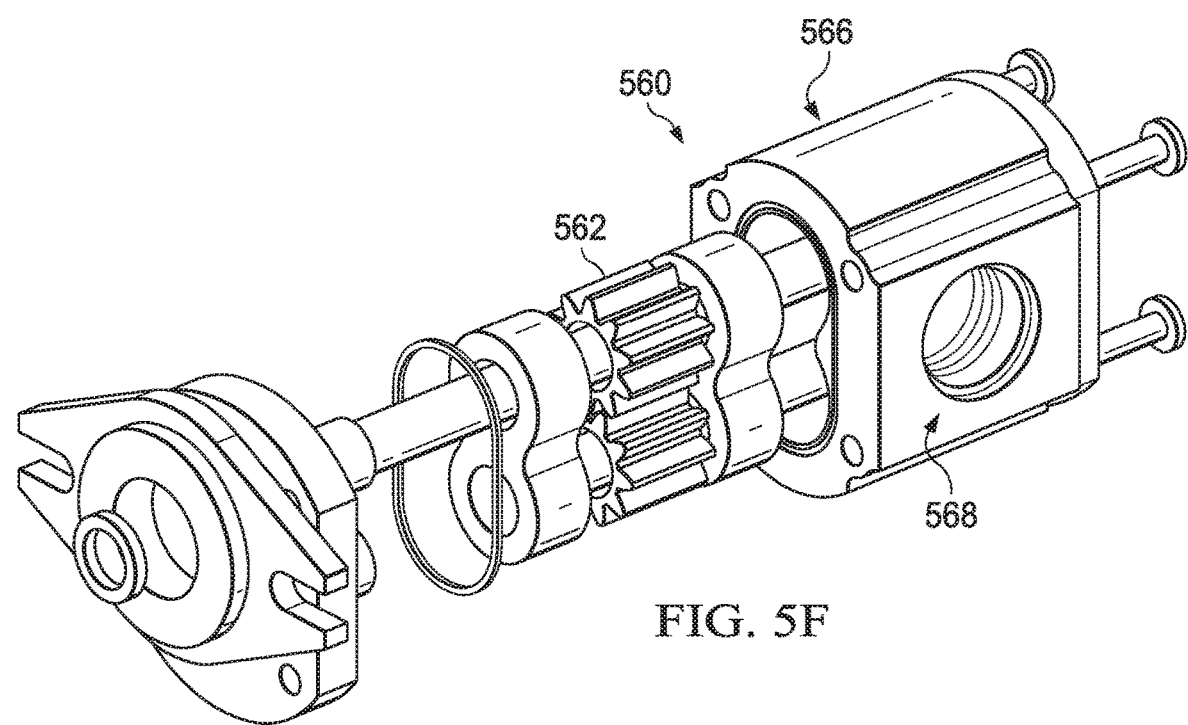

Turning to FIG. 5F, illustrated is a gear pump 560 that might be used with an ESCSSV manufactured and designed according to the disclosure. The gear pump 560, in the illustrated embodiment, includes one or more gears 562 that are driven by a motor (e.g., brushless DC motor in one embodiment), among other features, as well as a fluid inlet 566 and fluid outlet 568. While not shown, the gear pump 560 may additionally include an inlet check valve and an outlet check valve in certain embodiments. Those skilled in the art, given the disclosure herein, understand the various different operating conditions for the gear pump 560.

Figure 5G:
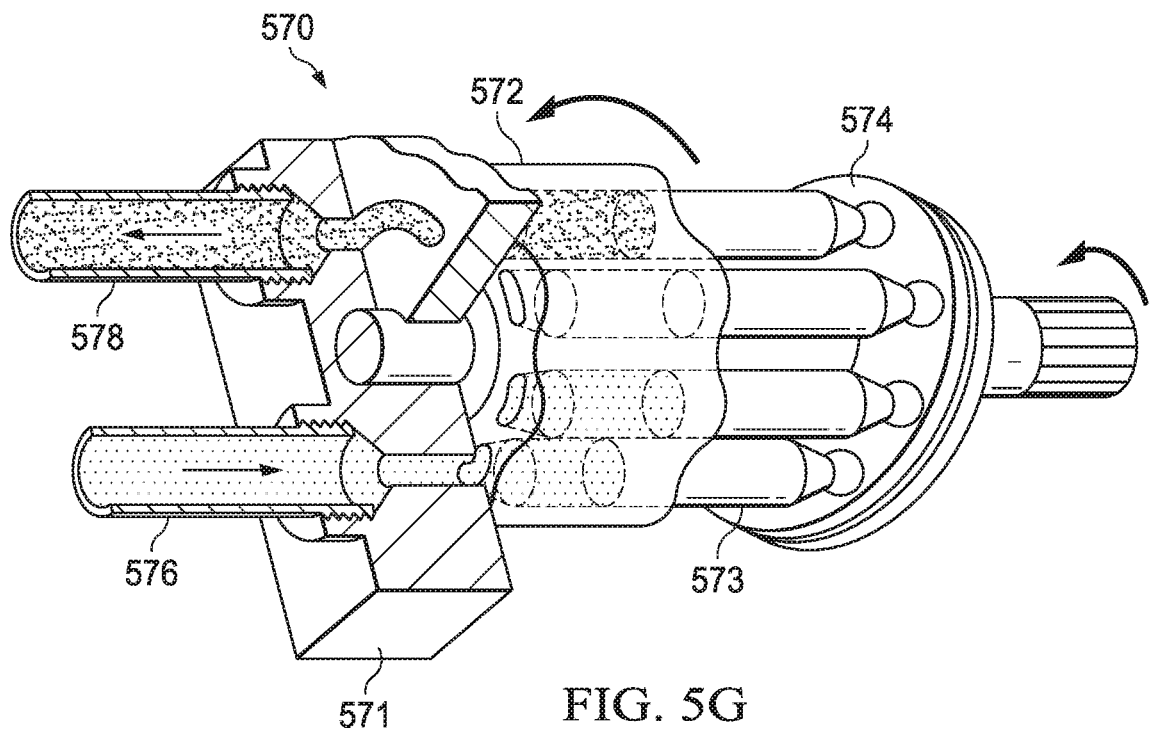

Turning to FIG. 5G, illustrated is a swash plate piston pump 570 that might be used with an ESCSSV manufactured and designed according to the disclosure. The swash plate piston pump 570, in the illustrated embodiment, includes a valve plate 571, a cylinder block 572, one or more pistons 573, and a swash plate 574, which may be driven by a motor (e.g., brushless DC motor in one embodiment), among other features, as well as a fluid inlet 576 and fluid outlet 578. While not shown, the swash plate piston pump 570 may additionally include an inlet check valve and an outlet check valve in certain embodiments. Those skilled in the art, given the disclosure herein, understand the various different operating conditions for the swash plate piston pump 570.

Figure 5H:
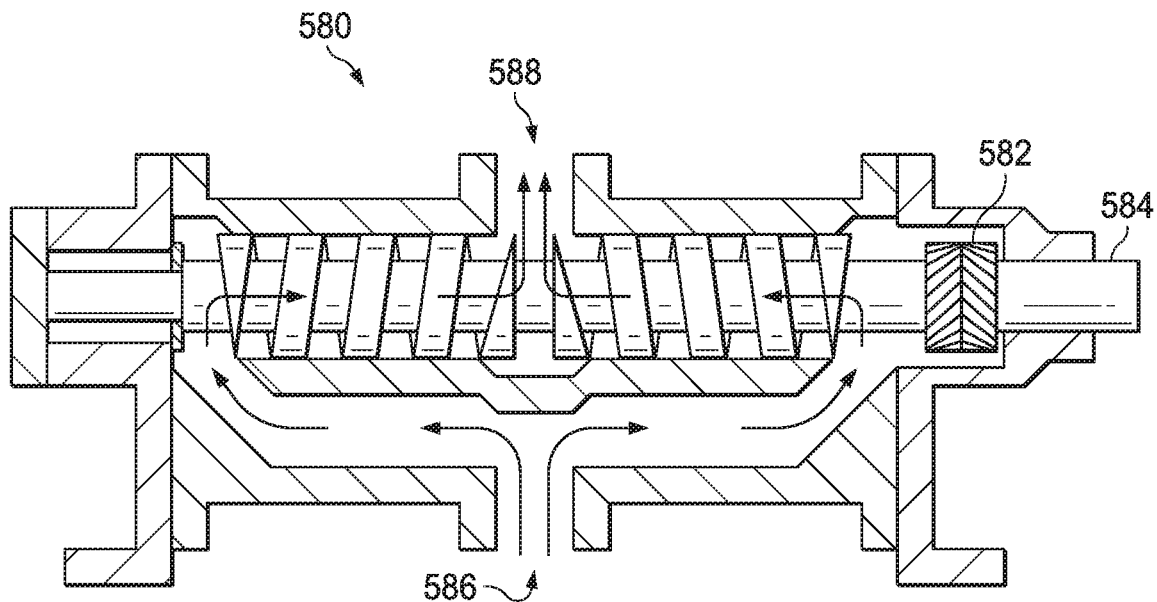

Turning to FIG. 5H, illustrated is a screw pump 580 that might be used with an ESCSSV manufactured and designed according to the disclosure. The screw pump 580, in the illustrated embodiment, includes timing gears 582 and a power-input shaft 584, among other features, which may be driven by a motor (e.g., brushless DC motor in one embodiment), as well as a fluid inlet 586 and fluid outlet 588. While not shown, the screw pump 580 may additionally include an inlet check valve and an outlet check valve in certain embodiments. Those skilled in the art, given the disclosure herein, understand the various different operating conditions for the screw pump 580.

Aspects disclosed herein include:

A. An electro/hydraulic valve for use in a hydrocarbon production well, the electro/hydraulic valve including a fluid chamber, and an electro/thermal expansion pump having a fluid inlet and a fluid outlet, and further wherein an inlet check valve is positioned in fluid communication between the fluid chamber and the fluid inlet and an outlet check valve is positioned in fluid communication between the fluid outlet and a hydraulically controlled actuation member.

B. An electrically surface-controlled subsurface safety valve, the electrically surface-controlled subsurface safety valve including 1) an outer housing comprising a central bore extending axially through the outer housing, the central bore operable to convey subsurface production fluids there through, 2) a valve closure mechanism disposed proximate a downhole end of the central bore, 3) a bore flow management actuator disposed in the central bore, 4) a piston coupled to the bore flow management actuator, the piston operable to move the bore flow management actuator between a closed state and a flow state to engage or disengage the valve closure mechanism to determine a flow condition of the subsurface production fluids through the central bore, and 5) an electro/hydraulic valve fluidly coupled to the piston for movement thereof, the electro/hydraulic valve including a fluid chamber and an electro/thermal expansion pump having a fluid inlet and a fluid outlet, and further wherein an inlet check valve is positioned in fluid communication between the fluid chamber and the fluid inlet and an outlet check valve is positioned in fluid communication between the fluid outlet and the piston.

C. A method of operating an electrically surface-controlled subsurface safety valve, the method including 1) providing an electrically surface-controlled subsurface safety valve downhole within a wellbore, the surface-controlled subsurface safety valve including: a) an outer housing comprising a central bore extending axially through the outer housing, the central bore operable to convey subsurface production fluids there through, b) a valve closure mechanism disposed proximate a downhole end of the central bore, c) a bore flow management actuator disposed in the central bore, d) a piston coupled to the bore flow management actuator, the piston operable to move the bore flow management actuator between a closed state and a flow state to engage or disengage the valve closure mechanism to determine a flow condition of the subsurface production fluids through the central bore, and e) an electro/hydraulic valve fluidly coupled to the piston for movement thereof, the electro/hydraulic valve including a fluid chamber and an electro/thermal expansion pump having a fluid inlet and a fluid outlet, and further wherein an inlet check valve is positioned in fluid communication between the fluid chamber and the fluid inlet and an outlet check valve is positioned in fluid communication between the fluid outlet and the piston, the method further including 2) sending power to the electro/thermal expansion pump to expand fluid located therein and axially urge the piston downhole to move the bore flow management actuator toward the flow state.

D. An electro/hydraulic valve for use in a hydrocarbon production well, the electro/hydraulic valve including a fluid chamber, and an electro/mechanical pump having a fluid inlet and a fluid outlet, and further wherein an inlet check valve is positioned in fluid communication between the fluid chamber and the fluid inlet and an outlet check valve is positioned in fluid communication between the fluid outlet and a hydraulically controlled actuation member.

E. An electrically surface-controlled subsurface safety valve, the electrically surface-controlled subsurface safety valve including 1) an outer housing comprising a central bore extending axially through the outer housing, the central bore operable to convey subsurface production fluids there through, 2) a valve closure mechanism disposed proximate a downhole end of the central bore, 3) a bore flow management actuator disposed in the central bore, 4) a piston coupled to the bore flow management actuator, the piston operable to move the bore flow management actuator between a closed state and a flow state to engage or disengage the valve closure mechanism to determine a flow condition of the subsurface production fluids through the central bore, and 5) an electro/hydraulic valve fluidly coupled to the piston for movement thereof, the electro/hydraulic valve including a fluid chamber and an electro/mechanical pump having a fluid inlet and a fluid outlet, and further wherein an inlet check valve is positioned in fluid communication between the fluid chamber and the fluid inlet and an outlet check valve is positioned in fluid communication between the fluid outlet and the piston.

F. A method of operating an electrically surface-controlled subsurface safety valve, the method including 1) providing an electrically surface-controlled subsurface safety valve downhole within a wellbore, the surface-controlled subsurface safety valve including a) an outer housing comprising a central bore extending axially through the outer housing, the central bore operable to convey subsurface production fluids there through, b) a valve closure mechanism disposed proximate a downhole end of the central bore, c) a bore flow management actuator disposed in the central bore, d) a piston coupled to the bore flow management actuator, the piston operable to move the bore flow management actuator between a closed state and a flow state to engage or disengage the valve closure mechanism to determine a flow condition of the subsurface production fluids through the central bore, and e) an electro/hydraulic valve fluidly coupled to the piston for movement thereof, the electro/hydraulic valve including a fluid chamber and an electro/mechanical pump having a fluid inlet and a fluid outlet, and further wherein an inlet check valve is positioned in fluid communication between the fluid chamber and the fluid inlet and an outlet check valve is positioned in fluid communication between the fluid outlet and the piston, the method further including 2) sending power to the electro/mechanical pump to axially urge the piston downhole to move the bore flow management actuator toward the flow state.

Aspects A, B, C, D, E and F may have one or more of the following additional elements in combination: Element 1: wherein the electro/thermal expansion pump is an induction heated electro/thermal expansion pump. Element 2: wherein the electro/thermal expansion pump is a heating coil heated electro/thermal expansion pump. Element 3: wherein the electro/thermal expansion pump is a thermoelectric module heated electro/thermal expansion pump. Element 4: wherein the electro/thermal expansion pump is a first electro/thermal expansion pump having a first fluid inlet and a first fluid outlet, and further including a second electro/thermal expansion pump having a second fluid inlet and a second fluid outlet, and further wherein a second inlet check valve is positioned in fluid communication between the fluid chamber and the second fluid inlet, and a second outlet check valve is positioned in fluid communication between the second fluid outlet and the hydraulically controlled actuation member, and further wherein a thermoelectric module is positioned between the first electro/thermal expansion pump and the second electro-thermal expansion pump so as to heat the first electro/thermal expansion pump while cooling the second electro-thermal expansion pump or heat the second electro/thermal expansion pump while cooling the first electro-thermal expansion pump. Element 5: wherein the electro/thermal expansion pump is a first electro/thermal expansion pump having a first fluid inlet and a first fluid outlet, and further including a second electro/thermal expansion pump having a second fluid inlet and a second fluid outlet, and further wherein a second inlet check valve is positioned in fluid communication between the fluid chamber and the second fluid inlet and a second outlet check valve is positioned in fluid communication between the second fluid outlet and the hydraulically controlled actuation member. Element 6: wherein the fluid chamber is a first fluid chamber and further including a second fluid chamber fluidly coupled to the first fluid chamber as part of a closed loop system, and further wherein the electro/thermal expansion pump is a first electro/thermal expansion pump having a first fluid inlet and a first fluid outlet, and further including a second electro/thermal expansion pump having a second fluid inlet and a second fluid outlet, and further wherein a second inlet check valve is positioned in fluid communication between the second fluid chamber and the second fluid inlet and a second outlet check valve is positioned in fluid communication between the second fluid outlet and the hydraulically controlled actuation member. Element 7: further including a relief valve positioned in fluid communication between the outlet check valve and the hydraulically controlled actuation member. Element 8: wherein the relief valve is a power to close relief valve. Element 9: wherein the hydraulically controlled actuation member is a piston. Element 10: wherein the electro/thermal expansion pump is an induction heated electro/thermal expansion pump, a heating coil heated electro/thermal expansion pump, or a thermoelectric module heated electro/thermal expansion pump. Element 11: wherein the electro/thermal expansion pump is a first electro/thermal expansion pump having a first fluid inlet and a first fluid outlet, and further including a second electro/thermal expansion pump having a second fluid inlet and a second fluid outlet, and further wherein a second inlet check valve is positioned in fluid communication between the fluid chamber and the second fluid inlet, and a second outlet check valve is positioned in fluid communication between the second fluid outlet and the hydraulically controlled actuation member, and further wherein a thermoelectric module is positioned between the first electro/thermal expansion pump and the second electro-thermal expansion pump so as to heat the first electro/thermal expansion pump while cooling the second electro-thermal expansion pump or heat the second electro/thermal expansion pump while cooling the first electro-thermal expansion pump. Element 12: wherein the electro/thermal expansion pump is a first electro/thermal expansion pump having a first fluid inlet and a first fluid outlet, and further including a second electro/thermal expansion pump having a second fluid inlet and a second fluid outlet, and further wherein a second inlet check valve is positioned in fluid communication between the fluid chamber and the second fluid inlet and a second outlet check valve is positioned in fluid communication between the second fluid outlet and the hydraulically controlled actuation member. Element 13: wherein the fluid chamber is a first fluid chamber and further including a second fluid chamber fluidly coupled to the first fluid chamber as part of a closed loop system, and further wherein the electro/thermal expansion pump is a first electro/thermal expansion pump having a first fluid inlet and a first fluid outlet, and further including a second electro/thermal expansion pump having a second fluid inlet and a second fluid outlet, and further wherein a second inlet check valve is positioned in fluid communication between the second fluid chamber and the second fluid inlet and a second outlet check valve is positioned in fluid communication between the second fluid outlet and the hydraulically controlled actuation member. Element 14: further including a power to close relief valve positioned in fluid communication between the outlet check valve and the hydraulically controlled actuation member. Element 15: further including alternating between the sending power to the electro/thermal expansion pump and cutting power to the electro/thermal expansion pump to axially urge the piston downhole to move the bore flow management actuator to the flow state. Element 16: wherein cutting power to the electro/thermal expansion pump cools liquid remaining therein, thereby drawing additional new liquid from the fluid chamber through the inlet check valve to the electro/thermal expansion pump. Element 17: further including a power to close relief valve positioned in fluid communication between the outlet check valve and the hydraulically controlled actuation member, the power to close relief valve configured to relieve pressure on the piston if power is lost to the power to close relief valve, and thus allow the bore flow management actuator to return to the closed state if power is lost to the power to close relief valve. Element 18: wherein the electro/mechanical pump is a ball screw pump. Element 19: wherein the electro/mechanical pump is a solenoid pump. Element 20: wherein the electro/mechanical pump is a series of solenoid pumps daisy chained together. Element 21: wherein the electro/mechanical pump is an electromagnet actuator pump. Element 22: wherein the electro/mechanical pump is a gear pump. Element 23: wherein the electro/mechanical pump is a swash plate piston pump. Element 24: wherein the electro/mechanical pump is a screw pump. Element 25: wherein the electro/mechanical pump is a first electro/mechanical pump having a first fluid inlet and a first fluid outlet, and further including a second electro/mechanical pump having a second fluid inlet and a second fluid outlet, and further wherein a second inlet check valve is positioned in fluid communication between the fluid chamber and the second fluid inlet and a second outlet check valve is positioned in fluid communication between the second fluid outlet and the hydraulically controlled actuation member. Element 26: wherein the fluid chamber is a first fluid chamber and further including a second fluid chamber fluidly coupled to the first fluid chamber as part of a closed loop system, and further wherein the electro/mechanical pump is a first electro/mechanical pump having a first fluid inlet and a first fluid outlet, and further including a second electro/mechanical pump having a second fluid inlet and a second fluid outlet, and further wherein a second inlet check valve is positioned in fluid communication between the second fluid chamber and the second fluid inlet and a second outlet check valve is positioned in fluid communication between the second fluid outlet and the hydraulically controlled actuation member. Element 27: further including a relief valve positioned in fluid communication between the outlet check valve and the hydraulically controlled actuation member. Element 28: wherein the relief valve is a power to close relief valve. Element 29: wherein the hydraulically controlled actuation member is a piston. Element 30: wherein the electro/mechanical pump is a ball screw pump, a solenoid pump, a series of solenoid pumps daisy chained together, an electromagnet actuator pump, a gear pump, a swash plate piston pump, or a screw pump. Element 30: wherein the electro/mechanical pump is a first electro/mechanical pump having a first fluid inlet and a first fluid outlet, and further including a second electro/mechanical pump having a second fluid inlet and a second fluid outlet, and further wherein a second inlet check valve is positioned in fluid communication between the fluid chamber and the second fluid inlet and a second outlet check valve is positioned in fluid communication between the second fluid outlet and the hydraulically controlled actuation member. Element 31: wherein the fluid chamber is a first fluid chamber and further including a second fluid chamber fluidly coupled to the first fluid chamber as part of a closed loop system, and further wherein the electro/mechanical pump is a first electro/mechanical pump having a first fluid inlet and a first fluid outlet, and further including a second electro/mechanical pump having a second fluid inlet and a second fluid outlet, and further wherein a second inlet check valve is positioned in fluid communication between the second fluid chamber and the second fluid inlet and a second outlet check valve is positioned in fluid communication between the second fluid outlet and the hydraulically controlled actuation member. Element 32: further including a power to close relief valve positioned in fluid communication between the outlet check valve and the hydraulically controlled actuation member. Element 33: wherein the electro/mechanical pump is a ball screw pump, a solenoid pump, a series of solenoid pumps daisy chained together, an electromagnet actuator pump, a gear pump, a swash plate piston pump, or a screw pump. Element 34: further including a power to close relief valve positioned in fluid communication between the outlet check valve and the hydraulically controlled actuation member, the power to close relief valve configured to relieve pressure on the piston if power is lost to the power to close relief valve, and thus allow the bore flow management actuator to return to the closed state if power is lost to the power to close relief valve.

Those skilled in the art to which this application relates will appreciate that other and further additions, deletions, substitutions and modifications may be made to the described embodiments.

What is claimed is:

1. An electro/hydraulic valve for use in a hydrocarbon production well, comprising:
    a fluid chamber, the fluid chamber configured to collect fluid leakage from a hydraulically controlled actuation member of a subsurface safety valve; and
    an electro/mechanical pump having a fluid inlet and a fluid outlet, and further wherein an inlet check valve is positioned in fluid communication between the fluid chamber and the fluid inlet and an outlet check valve is positioned in fluid communication between the fluid outlet and the hydraulically controlled actuation member.

2. The electro/hydraulic valve as recited in claim 1, wherein the electro/mechanical pump is a ball screw pump.

3. The electro/hydraulic valve as recited in claim 1, wherein the electro/mechanical pump is a solenoid pump.

4. The electro/hydraulic valve as recited in claim 1, wherein the electro/mechanical pump is a series of solenoid pumps daisy chained together.

5. The electro/hydraulic valve as recited in claim 1, wherein the electro/mechanical pump is an electromagnet actuator pump.

6. The electro/hydraulic valve as recited in claim 1, wherein the electro/mechanical pump is a gear pump.

7. The electro/hydraulic valve as recited in claim 1, wherein the electro/mechanical pump is a swash plate piston pump.

8. The electro/hydraulic valve as recited in claim 1, wherein the electro/mechanical pump is a screw pump.

9. The electro/hydraulic valve as recited in claim 1, wherein the electro/mechanical pump is a first electro/mechanical pump having a first fluid inlet and a first fluid outlet, and further including a second electro/mechanical pump having a second fluid inlet and a second fluid outlet, and further wherein a second inlet check valve is positioned in fluid communication between the fluid chamber and the second fluid inlet and a second outlet check valve is positioned in fluid communication between the second fluid outlet and the hydraulically controlled actuation member.

10. The electro/hydraulic valve as recited in claim 1, wherein the fluid chamber is a first fluid chamber and further including a second fluid chamber fluidly coupled to the first fluid chamber as part of a closed loop system, and further wherein the electro/mechanical pump is a first electro/mechanical pump having a first fluid inlet and a first fluid outlet, and further including a second electro/mechanical pump having a second fluid inlet and a second fluid outlet, and further wherein a second inlet check valve is positioned in fluid communication between the second fluid chamber and the second fluid inlet and a second outlet check valve is positioned in fluid communication between the second fluid outlet and the hydraulically controlled actuation member.

11. The electro/hydraulic valve as recited in claim 1, further including a relief valve positioned in fluid communication between the outlet check valve and the hydraulically controlled actuation member.

12. The electro/hydraulic valve as recited in claim 11, wherein the relief valve is configured to close when supplied power.

13. The electro/hydraulic valve as recited in claim 1, wherein the hydraulically controlled actuation member is a piston.

14. An electrically surface-controlled subsurface safety valve, comprising:
    an outer housing comprising a central bore extending axially through the outer housing, the central bore operable to convey subsurface production fluids there through;
    a valve closure mechanism disposed proximate a downhole end of the central bore;
    a bore flow management actuator disposed in the central bore;
    a piston coupled to the bore flow management actuator, the piston operable to move the bore flow management actuator between a closed state and a flow state to engage or disengage the valve closure mechanism to determine a flow condition of the subsurface production fluids through the central bore; and
    an electro/hydraulic valve fluidly coupled to the piston for movement thereof, the electro/hydraulic valve including;
    a fluid chamber, the fluid chamber configured to collect fluid leakage from the piston; and
    an electro/mechanical pump having a fluid inlet and a fluid outlet, and further wherein an inlet check valve is positioned in fluid communication between the fluid chamber and the fluid inlet and an outlet check valve is positioned in fluid communication between the fluid outlet and the piston.

15. The electrically surface-controlled subsurface safety valve as recited in claim 14, wherein the electro/mechanical pump is a ball screw pump, a solenoid pump, a series of solenoid pumps daisy chained together, an electromagnet actuator pump, a gear pump, a swash plate piston pump, or a screw pump.

16. The electrically surface-controlled subsurface safety valve as recited in claim 14, wherein the electro/mechanical pump is a first electro/mechanical pump having a first fluid inlet and a first fluid outlet, and further including a second electro/mechanical pump having a second fluid inlet and a second fluid outlet, and further wherein a second inlet check valve is positioned in fluid communication between the fluid chamber and the second fluid inlet and a second outlet check valve is positioned in fluid communication between the second fluid outlet and the piston.

17. The electrically surface-controlled subsurface safety valve as recited in claim 14, wherein the fluid chamber is a first fluid chamber and further including a second fluid chamber fluidly coupled to the first fluid chamber as part of a closed loop system, and further wherein the electro/mechanical pump is a first electro/mechanical pump having a first fluid inlet and a first fluid outlet, and further including a second electro/mechanical pump having a second fluid inlet and a second fluid outlet, and further wherein a second inlet check valve is positioned in fluid communication between the second fluid chamber and the second fluid inlet and a second outlet check valve is positioned in fluid communication between the second fluid outlet and the piston.

18. The electrically surface-controlled subsurface safety valve as recited in claim 14, further including a relief valve configured to close when supplied power positioned in fluid communication between the outlet check valve and the piston.

19. A method of operating an electrically surface-controlled subsurface safety valve, comprising:

providing an electrically surface-controlled subsurface safety valve downhole within a wellbore, the electrically surface-controlled subsurface safety valve including;

an outer housing comprising a central bore extending axially through the outer housing, the central bore operable to convey subsurface production fluids there through;

a valve closure mechanism disposed proximate a downhole end of the central bore;

a bore flow management actuator disposed in the central bore;

a piston coupled to the bore flow management actuator, the piston operable to move the bore flow management actuator between a closed state and a flow state to engage or disengage the valve closure mechanism to determine a flow condition of the subsurface production fluids through the central bore; and an electro/hydraulic valve fluidly coupled to the piston for movement thereof, the electro/hydraulic valve including;

a fluid chamber, the fluid chamber configured to collect fluid leakage from the piston; and an electro/mechanical pump having a fluid inlet and a fluid outlet, and further wherein an inlet check valve is positioned in fluid communication between the fluid chamber and the fluid inlet and an outlet check valve is positioned in fluid communication between the fluid outlet and the piston; and sending power to the electro/mechanical pump to axially urge the piston downhole to move the bore flow management actuator toward the flow state.

20. The method as recited in claim 19, wherein the electro/mechanical pump is a ball screw pump, a solenoid pump, a series of solenoid pumps daisy chained together, an electromagnet actuator pump, a gear pump, a swash plate piston pump, or a screw pump.

21. The method as recited in claim 19, further including a relief valve configured to close when supplied power positioned in fluid communication between the outlet check valve and a hydraulically controlled actuation member, the power to close relief valve configured to relieve pressure on the piston if power is lost to the power to close relief valve, and thus allow the bore flow management actuator to return to the closed state if power is lost to the power to close relief valve.

* * * * *

UNITED STATES PATENT AND TRADEMARK OFFICE
CERTIFICATE OF CORRECTION

| | | |
|---|---|---|
| PATENT NO. | : 11,885,202 B2 | |
| APPLICATION NO. | : 16/851890 | |
| DATED | : January 30, 2024 | |
| INVENTOR(S) | : James Dan Vick, Jr. and Bruce Edward Scott | |

It is certified that error appears in the above-identified patent and that said Letters Patent is hereby corrected as shown below:

On the Title Page

After:
"Prior Publication Date
US 2020/0392812 A1 Dec. 17, 2020"
Insert Item (30):
--Foreign Application Priority Data
Jun. 12, 2019 WO ............PCT/US2019/036813--

Signed and Sealed this
Second Day of July, 2024

Katherine Kelly Vidal
*Director of the United States Patent and Trademark Office*